THERMOPLASTIC FILM DRUM DATA STORAGE EQUIPMENT

Original Filed Aug. 25, 1958

16 Sheets-Sheet 1

Inventors
William C. Hughes
John E. Wolfe
by Charles W. Helzer
Their Attorney

July 13, 1965 W. C. HUGHES ETAL 3,195,112

THERMOPLASTIC FILM DRUM DATA STORAGE EQUIPMENT

Original Filed Aug. 25, 1958 16 Sheets-Sheet 2

Inventors
William C. Hughes
John E. Wolfe
by Charles W. Helzer
Their Attorney

THERMOPLASTIC FILM DRUM DATA STORAGE EQUIPMENT

Original Filed Aug. 25, 1958

Inventors
William C. Hughes
John E. Wolfe
by Charles W. Helzer
Their Attorney

HORIZONTAL DEFLECTION CIRCUIT (WRITING)

Inventors
William C. Hughes
John E. Wolfe
by Charles W. Helzer
Their Attorney

THERMOPLASTIC FILM DRUM DATA STORAGE EQUIPMENT

Original Filed Aug. 25, 1958 16 Sheets-Sheet 5

VERTICAL DEFLECTION CIRCUITS (WRITING)

Inventors
William C. Hughes
John E. Wolfe
by Charles W. Helzer
Their Attorney

THERMOPLASTIC FILM DRUM DATA STORAGE EQUIPMENT

Original Filed Aug. 25, 1958 16 Sheets-Sheet 6

Inventors
William C. Hughes
John E. Wolfe
by Charles W. Helzer
Their Attorney

Inventors
William C. Hughes
John E. Wolfe
by Charles W. Helzer
Their Attorney

THERMOPLASTIC FILM DRUM DATA STORAGE EQUIPMENT

Inventors
William C. Hughes
John E. Wolfe
by Charles W. Helzer
Their Attorney

THERMOPLASTIC FILM DRUM DATA STORAGE EQUIPMENT

Inventors
William C. Hughes
John E. Wolfe
by Charles W. Helzer
Their Attorney.

THERMOPLASTIC FILM DRUM DATA STORAGE EQUIPMENT

Original Filed Aug. 25, 1958

16 Sheets-Sheet 10

Inventors
William C. Hughes
John E. Wolfe
by Charles W. Helzer
Their Attorney

AUXILIARY VIDICON CIRCUITS
(READING)

Inventors
William C. Hughes
John E. Wolfe
by Charles W. Helzer
Their Attorney

THERMOPLASTIC FILM DRUM DATA STORAGE EQUIPMENT

Original Filed Aug. 25, 1958

16 Sheets-Sheet 12

Inventors
William C. Hughes
John E. Wolfe
by Charles W. Helzer
Their Attorney

TRACE REJECTION LOGIC

Inventors
William C. Hughes
John E. Wolfe
by Charles W. Helzer
Their Attorney

Inventors
William C. Hughes
John E. Wolfe
by Charles W. Helzer
Their Attorney

Inventors
William C. Hughes
John E. Wolfe
by Charles W. Helzer
Their Attorney

Inventors
William C. Hughes
John E. Wolfe
by Charles W. Helzer
Their Attorneys

United States Patent Office 3,195,112
Patented July 13, 1965

3,195,112

THERMOPLASTIC FILM DRUM DATA STORAGE EQUIPMENT

William C. Hughes, Scotia, and John E. Wolfe, Schenectady, N.Y., assignors to General Electric Company, a corporation of New York Original application Aug. 25, 1958, Ser. No. 757,083. Divided and this application Mar. 12, 1963, Ser. No. 264,571
20 Claims. (Cl. 340—173)

The present invention relates to a new and improved drum data storage equipment having uinque addressing features, and is a division of copending U.S. application Serial No. 757,083, filed August 25, 1958, and now abandoned, entitled "Thermoplastic Film Data Storage Equipment," W. C. Hughes and J. E. Wolfe, inventors, assigned to the General Electric Company, the assignee of the present invention.

More particularly, the invention relates to a new and improved drum data storage equipment that employs a solid impressionable thermoplastic film recording medium upon which data is recorded. The equipment is capable of storing relatively large quantities of data in a comparatively small space, and can be read out in response to a request for any particular block of data in comparatively short access times.

A copending U.S. patent application Serial No. 756,775 "Thermoplastic Film Data Storage Equipment," filed August 25, 1958 and now abandoned, W. C. Hughes, J. Wolfe and W. E. Glenn, inventors, assigned to the General Electric Company, describes a new and improved data recorder employing a thermoplastic film recording medium. The present invention describes and claims improved features of construction for a drum thermoplastic film data recorder of the type disclosed in the above identified application Serial No. 756,775, and which constitutes a practical working arrangement of the data recorder equipment generally disclosed and claimed in that application.

To be more particular, it is a primary object of the present invention to provide a new and improved drum thermoplastic film data recorder which employs a rotatable and axially translatable drum, having a solid impressionable thermoplastic film recording medium secured to its surface. The drum is constructed in such a manner that it can be readily rotated and translated in either direction axially to provide quick access to any desired block of data recorded thereon in response to an address supplied thereto.

Another object of the invention is to provide a new and improved data recorder employing a solid impressionable thermoplastic film recording medium which has unique addressing characteristics.

In practicing the invention, a new and improved solid impressionable thermoplastic film data recorder is provided which comprises a rotatable drum having a thermoplastic film recording medium formed on the surface thereof. The drum is both rotatable and translatable in either direction along its axis in response to an address. An electron writing apparatus is positioned adjacent to the drum for impressing electrons on the solid impressionable thermoplastic film recording medium in desired intelligence conveying patterns representing the data to be stored. Heating means are provided for heating the surface of the impressionable solid thermoplastic recording medium to a substantially liquid state to cause deformations of the surface in accordance with the electron patterns. The deformations thus recorded are then preserved upon the surface of the solid impressionabl thermoplastic film recording medium being returned to a solid state by cooling. Readout means are provided for inspecting the impressionable medium after the light modifying deformations are formed thereon to derive output electrical signals indicative of the intelligence contained in the electron patterns. In a preferred form of the invention, the readout means comprises an optical assembly for projecting an optical image of the intelligence patterns formed on the impressionable recording medium, and electron-optical means for deriving output electric signals representative of the intelligence formed in the patterns. In a further preferred embodiment of the invention, color separating means are interposed between the optical assembly and the electron-optical means with the electron-optical means viewing the projected optical image through the color separating means. The new and improved data recorder further includes automatic positioning means for positioning the rotatable drum both rotationally and longitudinally in any desired location with respect to the electron writing apparatus, the heating means, or the readout means. Position control means are provided for controlling the operation of the automatic positioning means which comprises a first selsyn system for accurately rotating the drum to position the thermoplastic film recording medium in a first dimension, and a second selsyn system for accurately moving the drum in either direction along its longitudinal axis to position the thermoplastic recording medium in a second dimension substantially at right angles with respect to the first dimension. Where the new and improved data recorder is to be employed as a digital data recorder, a digital-to-analog converter is employed for controlling each of the selsyn systems of the position control means in response to digital type address control signals. Also, in preferred arrangements of the new and improved thermoplastic film data recorder, readout logic circuit means are provided which employ data block edge recognition means to assure the fidelity of readout of the data stored. If desired, an electrically operative memory device may be employed in conjunction with the recorder. In further arrangements of the new and improved solid impressionable thermoplastic film data recorder, a program control circuit means is incorporated in the equipment for selectively controlling the operation of at least the electron writing apparatus, the position control means, the heating means, and the readout means.

Other objects, features and many of the attendant advantages of this invention will be appreciated more readily as the same becomes better understood by reference to the following detailed description when considered in connection with the accompanying drawings, wherein like parts in each of the several figures are identified by the same reference character, and wherein.

DRUM DATA STORAGE EQUIPMENT

*General block diagram*

Figure 1:
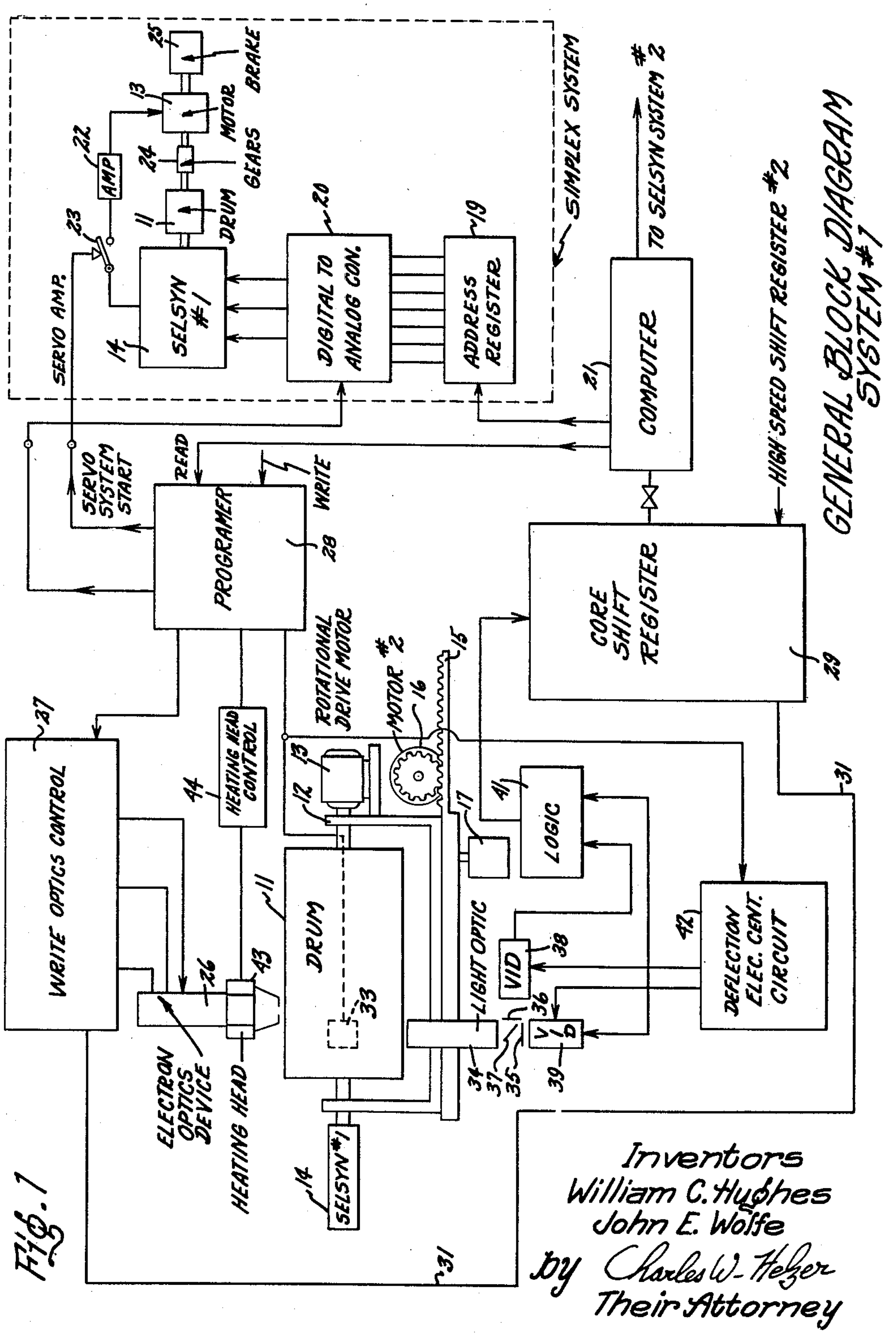
FIG. 1 is a functional block diagram showing the general arrangement of a drum data storage equipment constructed in accordance with the present invention.

The embodiment of the invention illustrated in FIG. 1 of the drawings includes an automatic positioning means for automatically positioning a thermoplastic film recording medium in response to a control signal, and comprises a drum storage unit wherein thermoplastic film is formed over the surface of the drum, and the data to be stored is formed by impressions made on the surface of the thermoplastic film. In this embodiment of the invention a rotatable transparent drum 11 is provided which has a thermoplastic film surface secured thereto. The thermoplastic film may be formed from a blend of polystyrene, m-terephenyl and a copolymer of 95 weight percent of butadiene and 5 weight percent styrene as disclosed in copending U.S. patent application Serial Number 8,842, filed February 15, 1960 and now Patent No. 3,113,179, entitled "Method, Apparatus and Medium for Recording," William E. Glenn, Jr., inventor, which is a continuation in part of U.S. patent application Serial Number 698,167, filed November 22, 1957 and now abandoned, William E. Glenn, Jr., inventor, entitled "Method and Apparatus for Electronic Recording," assigned to the General Electric Company. The rotatable drum 11 is journaled in a rack 12, and has one end of its shaft secured to a rotational servo drive motor 13, and the remaining end of the shaft secured to selsyn generator 14. The rack 12 has a ratcheted extension 15 on one of the ends thereof which engages and is driven by a second servo motor 16 that serves to drive the rack 12 longitudially along the axis of the rotatable drum 11 to any desired position. Also coupled to the rack 12 through a suitable gear arrangement, not shown, is a second selsyn generator 17. By this arrangement, the rotational servo motor 13 serves to rotate the drum 11 to any desired position along its periphery and the selsyn generator 14 will generate an electric signal indicative of this position. The longitudinal servo motor 16 serves to position the drum 11 to any desired position along its longitudinal axis, and the second selsyn generator 17 serves to develop an electric signal indicative of the longitudinal position of the drum. Both the rotational drive motor 13 and first selsyn generator 14 are included in a first selsyn system No. 1 for accurately positioning the drum 11 rotationally, and both longitudinal drive motor 16 and second selsyn generator 17 are included in a second selsyn system for accurately positioning the drum 11 longitudinally. Because both of the selsyn systems are identical in construction, only one of the systems has been disclosed at the right hand side of the drawing.

In addition to the motor 13 and selsyn generator 14, the first selsyn system comprises an address register 19 electrically coupled to a digital-analog converter 20 which converts the digital type electric address signal supplied to the address register from a computer with which the equipment is being used, indicated at 21, to an analog type electric signal which in turn is applied to the selsyn generator 14 to accurately position servo motor 13 in response to the address. The selsyn generator 14 is coupled back to the servo motor 13 through a suitable servo amplifier 22 and actuating switch 23 to form a closed loop selsyn system. To further assure accuracy in positioning of the drum 11, it is usually desirable to couple the motor 13 through reduction gears indicated at 24 to the drum, and to provide a braking arrangement indicated at 25 for the motor 13. Because the selsyn system will be described in greater detail subsequently, a further description of its construction and operation is believed unnecessary at this point. It should be indicated, however, that the first selsyn system serves to accurately position drum 11 at a desired point rotationally in response to an address supplied to the address register 19 thereof from computer 21. The second selsyn system, not shown, would include the motor 16 and second selsyn generator 17, and would serve to position the drum 11 longitudinally at a desired position in response to an address supplied thereto from computer 21.

In order to form impressions on the thermoplastic surface of the drum 11, an electron beam writing apparatus is provided which includes an electron optics device 26 which provides a pencil-like writing electron beam that can be scanned across the surface of the thermoplastic film on the drum 11 in the view of the devices, and to impress electron charges upon the surface of the thermoplastic film in desired patterns. The construction and operation of the electron optics device is described more fully in U.S. application S.N. 757,081, "Thermoplastic Information Storage System" by S. P. Newberry and J. F. Norton, General Electric Patent Docket 14D–1335, filed concurrently herewith, and assigned to the General Electric Company. However, it may be well to point out that the electron optics device 23 does serve to impress upon the thermoplastic film surface of drum 11 small light diffraction gratings of two different grating spacings for diffracting light of two different colors through a selective aperture. These gratings, or bits as referred to hereinafter, are formed by the electron beam from the electron optics and comprise a number or series of parallel lines which are spaced apart a distance determined by the color desired to be refracted or reflected. To provide gratings capable of diffracting light of two different colors, it would be necessary to provide two different grating types characterized by different spacings between the lines making up the gratings. Spacing of the electron beam marks in each grating is controlled by a writing optics control circuit 27 which is electrically connected to the deflection and accelerating electrodes of the electron optics device to control its operation. The write optims control circuit 24 is in turn controlled by control signals supplied there to from a program controller 28 and from a working core shift register 29. The core shift register 29 is designed to accommodate a block of information in digital form which would represent some 32 by 32 gratings or bits of information, as hereinafter referred to. This digital information is stored in the core shift register for convenience, and is read out serially and supplied to the write optics control 24 through a suitable connection indicated at 31. The information contained in the shift register 29 would be originally supplied thereto from the computer 21.

Also positioned adjacent the rotatable drum 11 is a read out means which in this instance comprises a light source 33 located within transparent drum 11 and positioned to illuminate a particular portion of the surface of the drum 11 so that light is refracted through the gratings thereon such that a a particular diffraction angle two different colored rays emerge from the illuminated portion as determined by the grating spacing. Gratings previously formed on the surface of the drum 11 diffract the light from light source 33 in two different distinctive colors, one of which represents a zero (0) in the binary code, and the other a one (1). The different colored light images are transmitted through a light optic system 34 to a color separating filter arrangement 35 and 36. A half-silvered mirror 37 serves to separate the light rays into two separate images, and direct the two images through the respective color filters 35 and 36 to an associated electron camera tube 38 or 39 which may be of the vidicon type. Electric signals generated by each of the vidicons 38 and 39 are supplied to an output logic circuit 41 which selectively supplies the data read out from drum 11 to the working core shift register 29 in the form of electric pulses representing the information in digital form. It follows, of course, that when the equipment is being used to read out information stored on the drum 11, the working shift register 29 is used to store the information supplied thereto by the output logic circuit. This information may then be used by the computer as required in any computation operation in which the computer may be involved. The operation of the vidicons 38 and 39 in reading out information supplied thereto by the optical assembly 34 is controlled by a deflection circuit 42 which in turn is controlled from the programmer 28 in response to commands received from the computer.

Prior to writing the electron patterns on the thermoplastic film to form the diffraction gratings, it may be necessary to heat the surface of the film to condition it to receive the charge patterns. Also, it may be desired to replace data already recorded on the thermoplastic film of the drum 11 with corrected data supplied to the core shift register 29 from the computer 21. For both of these purposes, and for curing the charge patterns as will be described hereinafter, a heating head 43 is mounted on the end of the electron optics device 26 adjacent the surface of the drum 11 as described in the above referred to patent application of Newberry and Norton. The heating head 43 is connected to a heating control circuit 44 that in turn is controlled from the programmer 28. The heating head 43 serves to apply heat to the thermoplastic film on the surface of drum 11 to condition it to cure it or to erase data already recorded thereon. Because of the nature of the thermoplastic film surface on the drum 11, sufficient heat for a critical period of time will serve to erase the gratings formed on the thermoplastic film. The new information in the core shift register may then be written on the thermoplastic film in the place of the old information that was erased.

As can be readily appreciated, the equipment can be used either to write data on the drum 11 to store the same for an indefinite period of usage latter, or alternatively to read out information that has been stored on the drum for use in some computational operation by the computer. Assuming it is desired to record some data on the surface of the drum 11, then the computer 32 supplies appropriate command signals to programmer 28 which in turn will initiate operation of the electron writing apparatus 26 through the write optics control circuit 27. Simultaneously, the data to be stored is supplied serially from core shift register 29 to the write control circuit after having been previously placed in the working core shift register 29 from the computer 21. This data is in digital form, and accordingly may be stored on the surface of the drum 11 by a series of two distinguishable gratings or bits. The nature of these bits will be described more fully hereinafter together with a full description of the manner in which bits are formed on the surface of the drum 11. It is believed adequate at this point in the disclosure to mention that the bits are in the form of a series of several equal length parallel lines, with one set of the lines representing for example zero (0) being spaced apart at a given distance ranging from 0.5 to 5 microns, and the other set of lines representing for example one (1) being spaced apart a different distance within the same range. It can be appreciated, therefore, that a long line of bits of information can be made which would represent binary data in the form of a series of ones and zeros. Having impressed the electron charges on the drum 11 in the desired patterns, with certain types of thermoplastic film it may be desirable to cure the charges by placing them under the heating head 43 for a short period of time in order to facilitate the action of the charge in forming the small marks or lines on the thermoplastic film. In this eventuality, after completion of recording of a block of bits of information contained in the working shift register 29, the programmer 28 may be set to actuate the heating head control circuit 44 thereby supplying heating current to the heating head 43, and effect curing of the block of bits by heating them thereby causing them to become viscose or fluid, at which point the charge will deform the film to produce the desired gratings. The programmer may then rotate the drum 11 under the electron optics device, and if need be advance it longitudinally to position it to accept the next block of bits to be recorded thereon. In order that any particular block of bits may be readily identified for the information contained therein, it is, of course, necessary that the data being recorded by properly coded by the location of the block in which it is written, or the coded identification be placed in an easily accessible position on the block of bits, or by some other means.

In order to utilize the equipment to read out information previously stored on the drum 11, it is merely necessary that the computer 21, or some other similar addressing mechanism, supply the desired address to the address register 19 in each of the selsyn systems driving the rotational servo motor 13, and the longitudinal servo motor 16. The two selsyn systems will then accurately position the drum 11 under the read out optical system 34 in response to the command from the computer 21 to the programmer 28. On being properly located, each of the selsyn systems will supply a signal to the programmer 28 indicating that the drum 11 is properly located whereupon the programmer will actuate the deflection circuits 42 of the read out vidicons 38 and 39, as well as the light source 33. The vidicons 38 and 39 then function to read out the information stored in the block of bits through the output logic circuit 41 to the working core shift register 29. Thereafter the information may be used by the computer 32 in its operations as required.

From a consideration of the above brief description of the new and improved data storage equipment, it can be appreciated that applicants have provided an entirely new data storage device capable of attaining high storage density thereby rendering possible the construction of a very small data storage equipment containing a large amount of stored information. Further, it can be appreciated that the device is highly reliable in operation, and is capable of providing desired information in a minimum access time.

*Position servo mechanism*

Figure 2:
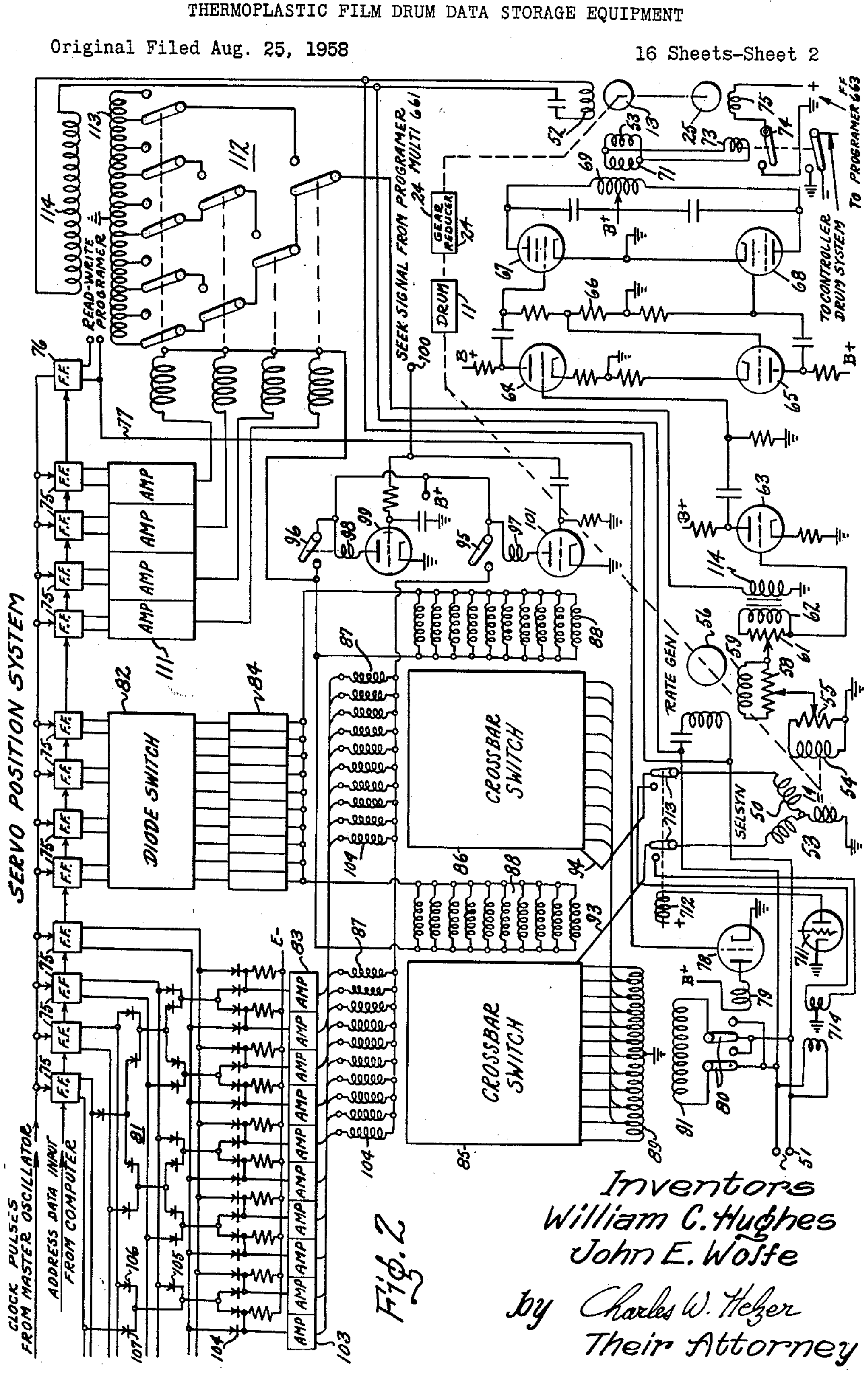
FIG. 2 is a combined functional block diagram and circuit diagram of a servo positioning system used with the drum data storage equipment of FIG. 1.

FIG. 2 of the drawings discloses the details of the construction of the selsyn systems No. 1 and No. 2, and in view of the fact that both systems are identical in construction, although they perform different functions, it is believed necessary to disclose only one of the systems in detail. The selsyn system is designed to drive the drum 11 to a desired position with respect to either the read out means or the electron beam writing apparatus. As was explained in connection with the systems shown in FIG. 1 of the drawings, the drum 11 is geared to servo motor 13 which may comprise any conventional servo motor such as those described in chapter 9 of the textbook entitled "Servo Mechanism Practice" by William R. Ahrendt, published by McGraw-Hill Publishing Company, 1954. Also mechanically connected to drum 11 so as to be rotated with it is the rotor winding 54 of the selsyn generator 14, and the rotor 56 of a rate generator to be described more fully hereinafter. To get the servo motor 13 to position the drum 11 in a desired location with respect to electron beam writing apparatus, or the read out means of the data storage equipment, a source of reference potential, indicated at 51, is connected across the stator field winding 52. Servo motor 13 is of the conventional type wherein torque will be developed depending upon the magnitude and polarity of the energizing signal supplied to the first field winding 52, and a second field winding 53 which is positioned traversely to the first field winding 52 so as to develop a rotating torque. As is well known with motors of this type, if an electro-magnetic flux is supplied from only one of the windings, for example field winding 52, the rotor of the motor 13 will not rotate, but will rotate only if there is an angular relationship between the electro-magnetic flux supplied from the two field windings 52 and 53. If the field supplied by field winding 52 is held steady, then the direction of rotation as well as the magnitude of rotation will be dependent upon the magnitude and polarity of electric signals supplied across the second field winding 53. This electric signal is developed by the selsyn 14 which has its stator or primary winding 50 connected across a pair of cross bar switches 85 and 86 to be described more fully hereinafter, and has its secondary or rotor windinig 54 mechanically shafted to the drum 11. Upon energizing the stator winding 50 with a control potential selected to be proportional to the position to which the drum 11 is to the rotated, the rotor winding will develop an error voltage whose magnitude and polarity is dependent upon the mechanical poistion of the rotor winding 54 with respect to the electromagnetic flux generated in stator winding 53 by the control potential. This error voltage is then amplified and fed to servo motor 13 and field winding 53 to cause motor 13 to rotate rotor winding 54 to zero out the error voltage.

The error voltage developed across rotor winding 54 is tapped off a load resistor 55 and coupled to a second load resistor 58 which is connected across one of the field windings 59 of rate generator 56. The load resistor 58 is in turn connected to the movable contact of still a third load resistor 61 connected across a secondary winding 62 of a transformer whose primary winding is connected to a relay tree to be described more fully hereinafter. The load resistor 61 is connected directly to the control grid of an electron tube 63 which is a conventional resistance-capacitance coupled power amplifier which amplifies the error signal supplied from resistor 61, and couples the amplified error signal through a resistance-capacitance coupling network to the control grid of an electron tube 64. Electron tube 64, in conjunction with an electron tube 65, and a voltage dividing resistor interconnecting the plates of electron tubes 64 and 65, and having a mid-tap point grounded, comprise a phase splitting network. This phase splitting network serves to develop two opposed in phase electric signals from the single signal supplied thereto from amplifier 63, and to couple the two signals to the control grid of a push-pull power amplifier comprised by electron tubes 67 and 68. The electron tubes 67 and 68 have their anodes connected to opposite ends of a primary winding 69 that is inductively coupled to a secondary winding 71 which in turn is connected across the second field winding 53 of servo motor 13. Also connected across the secondary winding 71 is a solenoid winding 73 of a relay having its movable contacts 74 connected in series circuit relationship with a source of alternating current voltage and the field winding 75 of a normally closed brake 25. By this arrangement, the appearance of a voltage across the secondary winding 71 is applied not only to the second field winding 53 of servo motor 13, but also serves to actuate relay 74, which in turn releases the brake 25 to allow the motor 13 to move to a new position in response to the error voltage applied to its second field winding 53.

The position that the rotor of servo motor 13 takes, and hence the position of the drum 11, is dependent upon the magnitude and polarity of the electric signal supplied across the second field winding 53 of servo motor 13 by the servo amplifier described in the preceding paragraph. It is possible by controlling this electric signal to control the position of the drum 11. This control is achieved by controlling the nature of the exciting voltage supplied across the primary or stator windings 50 of selsyn generator 14. Control of exciting voltage is in turn achieved by the cross bar switches 85 and 86, and the remaining address mechanism for actuating the cross bar switches to be described hereinafter.

The mechanism for actuating cross bar switches 85 and 86 comprises a plurality of bistable multivibrators or flip flop amplifiers 75, whcih are connected in series circuit relationship, and which have an address data input source connected to the first one thereof. Also, a source of shift signal pulses from the master clock oscillator of the equipment is connected in parallel circuit relationship to the inputs of all of the flip flop amplifiers for effectively shifting data set into the flip flop amplifiers from the address data source to the next succeeding flip flop amplifier in the string until the entire register is filled with the desired address data. The last flip flop amplifier 76 in the address register has its output connected to the programmer, and is designed to receive data indicating whether the equipment is to read or to write. For example, the output of the flip flop amplifier may be represented by a zero (0) voltage or a voltage level representing a one (1) in binary form, and it may be chosen that the read indication from flip flop 76 is a one (1), while the write indication will be represented by a zero (0). Accordingly, flip flop amplifier 76 will provide to the programmer a signal indicating whether the equipment is to read or to write. Simultaneously, this signal is supplied through a conductor 77 to the control grid of an amplifier 78 having a solenoid winding 79 connected in the plate circuit thereof for operating a selector switch 80, the function of which will be described more fully hereinafter.

The first two groups of four flip flop amplifiers 75 are connected through two pyramid arrays of diode rectifiers 81 and 82 which comprise diode switches. Each of the diode switches 81 and 82 comprise conventional pyramid diode matrices of the type described on page 41 of the textbook entitled "Digital Computer Components and Circuits" by R. K. Richards, published by D. Van Nostrand Company, 1957, and function to selectively connect desired ones of the outputs of the group of four flip flop amplifiers 75 to which they are connected, to the input of associated output amplifiers 83 and 84, respectively. Each of the output amplifiers 83 and 84 are connected to respective associated holding magnet solenoid windings 87 and 88, respectively, which serve to actuate holding magnets in the cross bar switches 85 and 86, respectively. Upon being thus actuated, the cross bar switches 85 and 86 function to select out a single point on a multitap transformer secondary winding 89 whose primary winding 91 is connected through selector switch 79 to the source of reference voltage 51.

The cross bar switches 85 and 86 are of conventional construction such as described on page 194 of the textbook entitled "The Design of Switching Circuits" by W. Keister, A. E. Ritchie, and S. W. Washburn of the Bell Telephone Laboratory Technical Staff, published by the Van Nostrand Company, 1951. By selective actuation of the holding magnets thereof by proper energization of the solenoid windings 87 and 88, the cross bar switches 85 and 86 will function to connect a selected portion of the secondary winding 89 through the conductors 93 and 94 across the primary of stator winding 53 of selsyn generator 14. To accomplish this, the solenoid windings 87 and 88 must be connected to a source of energizing potential after having been properly lined up by the diode switches 81 and 82. For this purpose, one end of each of the groups of solenoid windings 87 and 88 is connected through relay switches 95 and 96, respectively, to a source of positive potential B+. The source of positive potential B+ is also connected through a pair of solenoid windings 97 and 98, respectively, that actuate switches 95 and 96, respectively, to the anodes of a pair of triode electron discharge tubes 99 and 101. The control grids of triodes 99 and 101 are connected together, and have a control seek signal supplied thereto from the programmer of the equipment. With this arrangement, upon the diode switches 81 and 82 selecting the proper solenoid windings 87 and 88 to be actuated in each of the cross bar switches 85 and 86, the last flip flop amplifier 76 will notify the programmer which will then transmit a control seek signal to triodes 99 and 101 to close the relay contacts 95 and 96, and thereby apply an energizing potential to the selected solenoid windings. Upon this occurrence, the selected contact in the cross bar switch 85 will connect the conductor to a selected tap off point on the multitap secondary winding 89, and the selected contact of cross bar switch 86 will connect conductor 94 to a second tap off point on the multitap secondary winding 89. In this manner, the address supplied to the flip flop amplifiers 75 operates to apply the correct positioning energizing potential to the selsyn generator 14 to cause it to drive servo motor 13 to properly locate drum 11 in response to the address.

The diode switches 81 and 82, and cross bar switches 85 and 86 function to apply the correct energizing potential to the stator winding 53 of selsyn 14 upon the input register comprised by the flip flop amplifiers 75 upon being filled. For purposes of illustration, it will be assumed that the last four flip flop amplifiers 75 in the series have been supplied with the identifying address represented by the binary digits 1001 as indicated on the drawings. From an examination of the diode switch 81, it will be appreciated that the input of the amplifiers 83 will all be connected to ground potential with the exception of the last amplifier 103 in the row. Amplifier 103 will be connected to the source of negative potential E− by reason of the fact that each of the diode rectifiers 104, 105, 106 and 107 which could conceivably be connected to the input of amplifier 103 are all connected to the one (1) or negative potential side of the output lines from the flip flop amplifiers 75. Accordingly, the source of negative potential E− is effectively connected to the input of the amplifier 103, and its associated solenoid winding 104 in each of the cross bar switches 85 and 86 will be energized upon the source of positive potential B+ being connected to the remaining side thereof by closing the relay switches 95 and 96. The diode switch 82 will operate similarly to select a holding solenoid 88 in each of the cross bar switches to thereby connect the proper portion of the secondary winding 89 through conductors 93 and 94 to the stator winding 50 of selsyn generator 14. There are 10 holding magnets in the vertical and 10 holding magnets in the horizontal plane. Accordingly, the primary winding 89 has 100 tap off points which can be selected by the cross bar switch 85 and by the cross bar switch 86. In this manner, any desired position control potential may be applied across the stator winding which will then function to drive the rotor winding 54 to a position so as to null the output voltage supplied to the second field winding 72 of servo motor 13 in a conventional servo mechanism manner. As described previously, the selected position control voltage supplied to the stator winding 53 will develop in the rotor winding 54 a potential which will be supplied through the load resistors 55, 58 and 61, amplifier 63, phase splitters 64 and 65, and push-pull power amplifiers 67 and 68 to the primary winding 69 of the output transformer. This potential will then develop an electromagnetic flux producing current in the second field winding 53 of motor 13 and will tend to drive motor 13 in a direction to null out the voltage. The direction of rotation will, of course, be determined by the setting of the selector switch 79 and hence will be in accordance with the read-write control signal from the programmer. As the motor 13 tends to rotate, it will drive rate generator 56 which develops a damping potential across the field winding 59 which is in opposition to the voltage developed across rotor winding 54 so as to stabilize the operation of the system. For a more complete description of this phenomena, reference is made to any of the standard textbooks on servo mechanisms.

From a consideration of the cross bar switches 85 and 86 and a multitap primary winding 89 of the transformer, it can be appreciated that the reference potential applied to the stator winding 53 can only position the drum 11 to any one of the 100 positions corresponding to the 100 points on the multitap primary. Because it is desired to have a finer control over the position of the drum 11, a fine positioning control means is provided through the last four flip flops 75 in the register. The output potential from these flip flops is connected through associated amplifiers 111 to respective solenoid windings of a relay tree indicated at 112. The relay tree 112 has its circuit making contacts connected to a multitap secondary winding 113 of a precision transformer whose primary winding 114 is connected across source of reference potential 51. The multitap secondary winding 113 has its center point grounded, and a selection part of its windings may be selectively connected by means of relay tree 112 across the primary winding 114 of a transformer whose secondary winding 62 is connected in the servo amplifier. The signal potential developed across the secondary winding 62 is supplied through load resistor 61 and the remainder of the servo amplifier to the second field winding 53 of servo motor 13. By reason of this arrangement, the last four flip flop amplifiers will connect up the relay tree 112 in a manner so as to select out a desired part of the 10 positions on the multitap secondary winding 113, and apply the potential appearing across the selected part to winding 114, and hence to second field winding 53 of servo motor 13. Because the servo motor 13 will tend to null out the potential supplied across the second field winding 53, this added voltage across winding 114 in effect serves to select any one of 10 positions within any one of the 100 positions selected by the cross bar switches 85 and 86. As a consequence, the servo mechanism can function to select out any one of 1000 positions around the circumference of the drum 11, or in the event the selsyn system is used to longitudinally position the drum, it will function to select out any one of 1000 positions along the longitudinal axis of the drum.

*Writing circuits block diagram*

Figure 3:
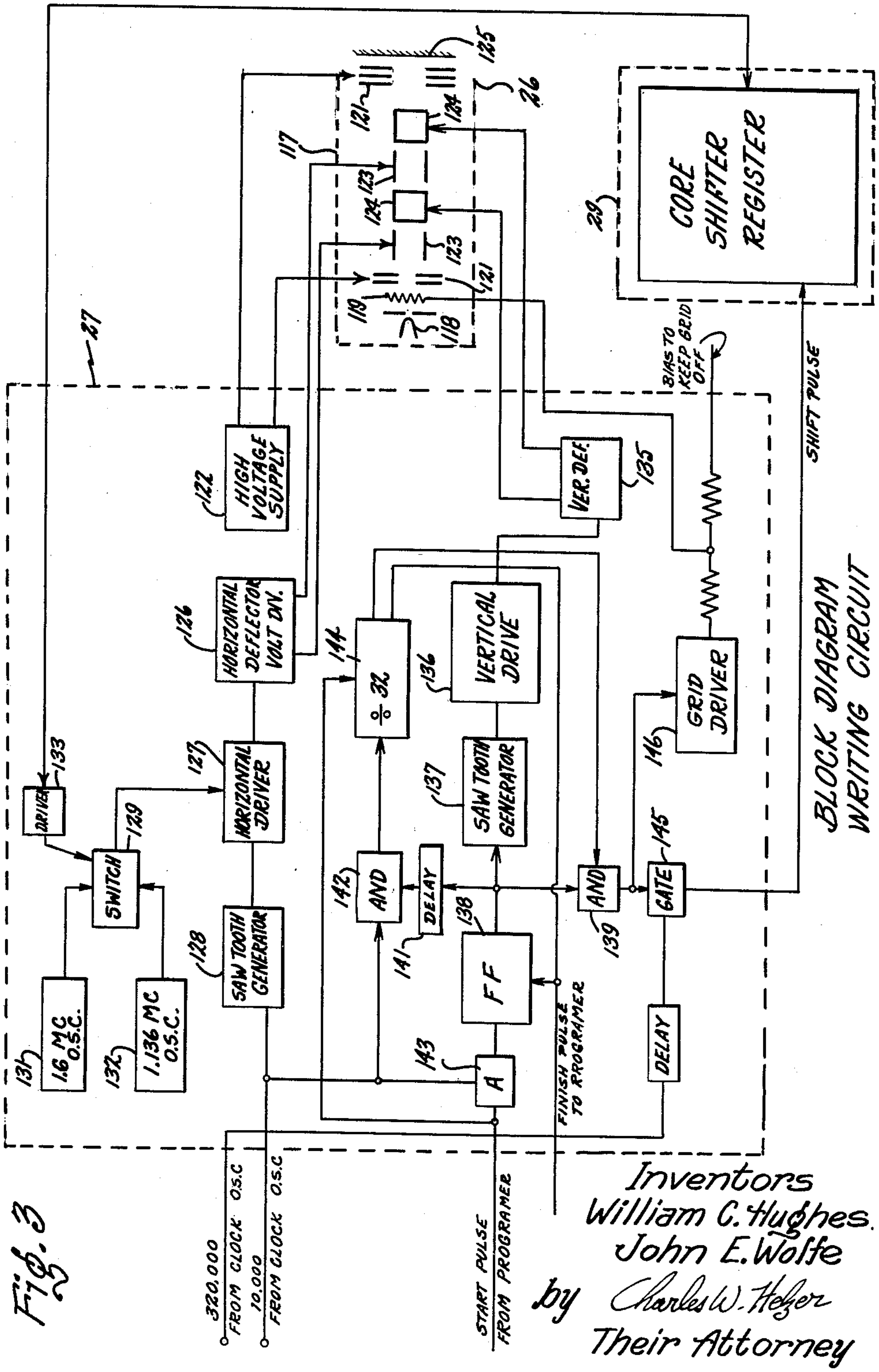
FIG. 3 is a functional block diagram of the writing system used in the drum data storage equipment of FIG. 1.

FIG. 3 of the drawings discloses more of the details of the writing circuits associated with the electron beam writing apparatus 26. The electron beam writing apparatus 26 is illustrated schematically and comprises an evacuated cylinder 117 having an electron emissive cathode 118 for producing an electron beam which is focused to provide a fine line shaped beam in cross section, a control grid 119 for turning the electron beam on and off, and a pair of accelerating electrodes 121 which are electrically connected to a high voltage power supply 122. The electron beam writing apparatus is further comprised by a pair of horizontal deflection electrodes 123 which deflect the electron beam of the apparatus in a horizontal plane, and a pair of vertical deflection electrodes 124 which deflect the electron beam of the apparatus in the vertical plane. By proper combination of the deflection voltages applied to the vertical and horizontal deflection electrodes 123 and 124, the electron beam of the apparatus may be caused to trace out desired patterns containing data to be stored on the surface of the thermoplastic film illustrated at 125. For a more detailed description of the construction and operation of the electron beam writing apparatus, reference is made to the above identified copending patent application of Newberry and Norton (General Electric Patent Docket 14D–1335).

The horizontal deflection electrodes 123 are supplied from a voltage dividing network 126 which in turn derives its potential from a driver circuit 127. The driver circuit 127 has one of its inputs connected to a saw tooth generator 128 that is controlled from a source of 10,000 cycles per second signals supplied by a master clock oscillator associated with the equipment. The driver circuit 127 also has a second input circuit which is connected to the output of a diode switch 129 that in turn has two separate signal sources 131 and 132 connected thereto. Also connected to the diode switch 129 is a switch driver circuit 133 which serves to actuate the switch so as to connect the signal oscillations produced by either the oscillator 131 or the oscillator 132 to the horizontal driver circuit 127. The diode switch actuation is done by the switch driver circuit 133 in response to data information to be written on the thermoplastic applied thereto from the core shift register 29. The crystal oscillators 131 and 132 comprise conventional crystal stabilized oscillators of the type described in chapter 9.9 of the textbook entitled "Active Networks," by Vincent C. Rideout, published by the Prentice-Hall Company, New York, 1954. Each of the crystal oscillators 131 and 132 produces a modulating signal having a frequency of 1.6 megacycles and 1.136 megacycles respectively, so that the two signals are distinctly different, that are selectively applied through the diode switch 129 to the horizontal driver circuit 127. In the horizontal driver circuit 127 either one of the two modulating signals from the diode switch 129 is modulated on the basic saw tooth wave form signal supplied from saw tooth generator 128, and the resultant modulated saw tooth wave form signal is supplied to the horizontal deflection voltage divider 126 and to the horizontal deflection electrodes 123.

The vertical deflection electrodes 124 of electron beam writing apparatus 26 are connected to a vertical deflection voltage divider 135 which in turn is connected to a vertical drive circuit 136 that has a saw tooth wave form potential supplied thereto from a saw tooth generator 137. An operating potential is supplied to saw tooth generator 137 from a flip flop amplifier 138 which also supplies an operating potential to a first and gate 139, and through a delay circuit 141 to a second and gate 142. Flip flop circuit 138 is controlled by the output potential from a third and gate 143 which has initiating signals supplied thereto in the form of a start pulse from the programmer, and from the source of 10,000 cycle oscillations supplied by the master clock oscillator of the equipment. The master clock oscillator also supplies the horizontal saw tooth generator 128 with a synchronizing potential, so that the 10,000 c.p.s. signal is synchronized with the horizontal sweep frequency rate. This 10,000 c.p.s. signal source is also connected to the second and gate 142 which has its output connected to a divider network 144 that is gated by a gating signal supplied thereto from the programmer to initiate its operation. The divider network 144 supplies one output potential to the first and gate 139, and a second output potential back to the programmer to provide a finished signal indication to the programmer upon completion of the writing operation by the writing circuits. First and gate 139, which receives an operating potential from flip flop amplifier 138, upon opening supplies an output potential in parallel to a gating device 145, and to a grid driver circuit 146. The gating device 145 upon opening connects a source of 320,000 cycles per second shift pulses supplied from the master clock oscillator to the core shift register 129 for the purpose of serially shifting out data contained in the core shift register and supplying same to the switch driver circuit 133. The grid driver 146 provides an operating potential to the control grid 119 of electron beam writing apparatus 26 to turn the apparatus on during periods when data contained in the core shift register is to be written, and during other periods to turn the electron beam off.

Upon actuation of the writing apparatus, the master clock oscillator supplies synchronizing pulses to both the horizontal saw tooth generator 128, and to each of the and gates 142 and 143. Simultaneously, shift pulses are supplied to the gating device 145 from the source of 320,000 cycle oscillations. Horizontal saw tooth generator 128 is synchronized with the incoming 10,000 cycle oscillation, and its saw tooth wave form output potential is supplied to the horizontal driver circuit 127 where it is combined with a modulating signal from either the 1.6 megacycle oscillator 131 or the 1.13 megacycle oscillator 132 depending upon the selective operation of the diode switching device 29 in response to actuation from the switch driver circuit 133. Since there is no data supplied to the switch driver 133, only one of the oscillators (normally oscillator 131) will be connected by the diode switch 29 to the horizontal driver circuit 127. Simultaneously with the actuation of the horizontal deflection circuits, the 10,000 cycle clock pulses are supplied to each of the and gates 142 and 143 whereupon the occurrence of a start signal from the programmer, divider circuit 144 is energized, and second and gate 143 is opened. Opening of the and gate 143 supplies an operating potential to flip flop circuit 138 which in turn supplies an output potential to the vertical saw tooth generator 137, and to the first and second and gates 139 and 142, respectively. The potential supplied by the flip-flop circuit 138 to the and gate 142 is delayed for a period of time by delay circuit 141 sufficient to coincide with the next incoming clock pulse from the source of 10,000 c.p.s. pulses, and this coincidence opens and gate 142 which starts divider network 144. Upon the divider network 144 being actuated, an energizing potential is supplied to the first and gate 139 which together with the potential from flip flop 138, opens and gate 139, and actuates the grid driver 146 and gating device 145 so that the core shift register is supplied with the 320,000 c.p.s. clock pulses. Simultaneously with this action, the saw tooth generator 137 has been actuated by flip flop 138 so that a saw tooth wave form potential is supplied to the vertical drive circuit 136, the vertical deflection voltage divider 135, and to the vertical deflection electrodes 124. Accordingly, upon the electron beam being turned on by the grid driver circuit 146, a vertical deflection voltage will be supplied to the vertical deflection electrodes in coincidence with the horizontal deflection voltage supplied to the horizontal deflection electrodes. Simultaneously with this action, the data in the core shift register will be shifted out of the register by the shift pulses supplied from 320,000 cycles source, and will acuate the switch driver circuit 133 so as to open switch 129 in response to the data being supplied thereto. Switch 129 thereafter will shift either the 1.6 megacycle oscillator 131 or the 1.136 megacycle oscillator 132 in circuit relationship with the horizontal driver circuit 127 so as to modulate the basic horizontal sweep voltage with a characteristic modulation signal representing either a zero (0) or one (1) to be recorded on the thermoplastic film 125 by the electron beam as it is scanned across the face of the thermoplastic film. It can be appreciated that the first such lines scanned across the surface of the thermoplastic film will initiate operation of the divider network 144. This network is a divide by 32 network so that it will allow 32 horizontal scans of the electron beam upon the completion of which it will produce an output signal potential which is supplied to the programmer to indicate that 32 horizontal lines of data have been recorded, and also turns off the flip flop 138. Upon flip flop 138 being turned off, the vertical saw tooth generator 137 is inactivated and both the first and second and gates 139 and 142, respectively, are closed. Upon this occurrence, gating device 145 cuts off the shift pulses being supplied to the core shift register, and the grid driver circuit 146 is cut off thereby allowing the control grid 119 to turn off the electron beam of the writing apparatus 26. Thereafter, the electron beam writing apparatus will not record until it receives another start pulse from the programmer whereupon the writing cycle just described will be repeated.

*Horizontal deflection writing circuits*

Figures 4, 5:
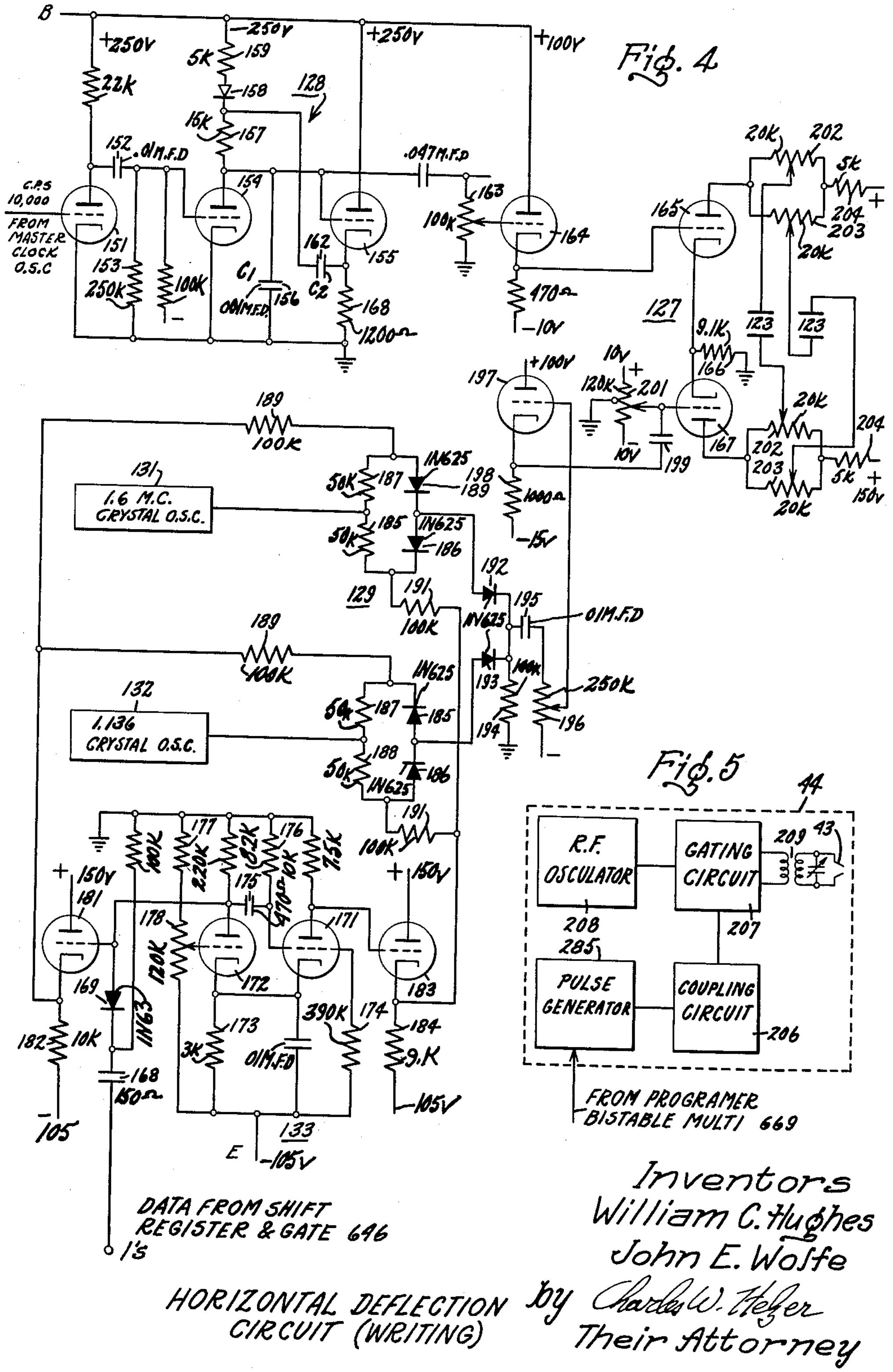
FIG. 4 is a circuit diagram showing the details of construction of the horizontal deflection control circuits used in the writing system of FIG. 3.
FIG. 5 is a functional block diagram showing the construction of the heating head control circuit comprising a part of the drum data storage equipment shown in FIG. 1.

The circuit diagram of the horizontal sweep voltage generating circuit is shown in FIG. 4 of the drawings wherein the horizontal deflection plates of the electron beam writing apparatus are shown at 123, and have a sweep potential applied thereto at a rate which is synchronized with 10,000 c.p.s. oscillations supplied from the master clock oscillator to the control grid of an electron tube 151. Electron tube 151 comprises a conventional R-C coupled amplifier which amplifies and reverses the polarity of the signal pulses received from the master clock oscillator, and supplies them to the control grid of a triode electron tube 154. Electron tube 154 in conjunction with an electron tube 155, and a charging capacitor 156 comprises a boot strap sweep generator for developing the basic saw tooth wave form sweep potential to be applied to the deflection electrodes 123. Electron tube 154 has its anode connected through a first load resistor 157, a diode rectifier 158, and a second load resistor 159 to a source of positive plate potential, and is also connected to the control grid of electron tube 155 across charging capacitor 156. Electron tube 155 has its anode connected directly to the source of positive potential, and has its cathode connected to a cathode load resistor 161 and through a coupling capacitor 162 to the junction intermediate the first load resistor 157 and rectifier 158. The electron tube 155 is normally conductive due to the positive bias on its control grid. Conduction through tube 155 builds up a positive potential across the cathode load resistor 161 which is coupled back regeneratively to build up the charge across charging capacitor 156 in a boot strap fashion. The parameters of this regenerative circuit are such that the charge across the capacitor 156 builds up linearly in a saw tooth fashion until such time that a pulse is supplied to the control grid of the electron tube 154, whereupon the capacitor 156 is discharged rapidly thereby producing a saw tooth wave shape voltage which is supplied across an output load resistor 163. Load resistor 163 has an adjustable contact which is connected to the control grid of a cathode follower amplifier 164 which has its cathode load resistor connected to the control grid of a triode electron tube 165. Triode 165 has its cathode connected through a common cathode load resistor 166 to a second triode 167, which together comprise a driver modulator circuit for effectively modulating the saw tooth wave shape horizontal scan voltage supplied from the sweep generator 128 with the data intelligence to be written by the electron beam of the electron beam writing apparatus. For this purpose, the data from the shift register 29 is supplied in the form of negative signal pulses through a coupling capacitor 168 and diode rectifier 169 to the control grid of a triode electron discharge tube 171 of a monostable multivibrator which further includes an electron tube 172. Triode 171 has its anode connected through a suitable plate load resistor to a source of positive potential, preferably ground, and has its cathode connected through a common cathode resistor 173 to a source of negative potential. The cathode or triode tube 171 is also connected by a grid resistor 174 to the source of negative potential, and through a charging capacitor 175 to the anode of triode 172. A plate load resistor connects the anode of triode 172 to the source of positive potential, and the cathode of triode 172 is connected through common cathode resistor 173 to the negative potential. A biasing resistor 176 is connected to the control grid of the electron tube 171 so that a voltage divider is formed by the series connected resistors 174 and 176 to provide grid bias to electron tube 171. Grid bias is supplied to triode 172 from a pair of resistors 177 and 178 connected in series between the source of positive potential (in this case ground) and the source of negative potential with the control grid of electron tube 172 being connected to a mid-tap point on the resistor 178. By proper selection of the values of the voltage dividing resistors 174, 176, and 177 and 178, the electron tube 171 is maintained in a normally conducting condition. As a consequence, a positive bias is developed across the common cathode resistor 173 which maintains electron tube 172 non-conducting. As a result, a positive potential is supplied to the control grid of a cathode follower amplifier 181 having its cathode load resistor connected to the bidirectional diode switch 129. Conversely, a cathode follower amplifier 183 having its control grid connected to the plate of electron tube 171 will be cut off. Upon the occurrence of a negative signal pulse supplied from the core shift register, the control grids of both cathode follower amplifier 181 and electron tube 171 are driven negative so that they are rendered non-conductive, and electron tube 172 becomes conductive. The anode of the electron tube 171 then becomes sufficiently positive to render cathode follower amplifier 183 conductive, and supply an output signal pulse to the bidirectional diode switch 129. Concurrently with this action, the charging capacitor 175 is being charged until such time that electron tube 171 again becomes conductive with the electron tube 172 being rendered non-conductive, and the circuit returns to its original condition. Accordingly, it can be appreciated that the monostable multivibrator 133 functions to provide positive switching potentials through the cathode follower amplifiers 181 and 183 to the bidirectional diode switch 129. For a more detailed description of the construction and operation of monostable multivibrating circuits, reference is made to the textbook entitled "Pulse and Digital Circuits" by Millman and Taub, published by the McGraw-Hill Book Company. Particular reference is made to page 198 of this text which illustrates and describes a similar circuit.

The output from monostable multivibrator 133 is coupled through cathode follower amplifiers 181 and 183 to the bidirectional diode switch 129. Diode switch 129 actually comprises a pair of bidirectional diode gates. Each of the diode gates is formed by two diode rectifiers 185 and 186 connected serially in bridge circuit relationship with a pair of resistors 187 and 188. The junctions of the resistors 187 and 188 are connected to the output of crystal oscillator 131 or 132. The junctions of the resistors 187 and the cathodes of diode rectifiers 185 are connected through coupling resistors 189 to the cathode load resistor 182 of cathode follower amplifier 181. The junctions of resistors 188 and the anodes of diode rectifiers 186 are connected through coupling resistors 191 to cathode load resistor 184 of cathode follower 183. The junctures of the two diode rectifiers 185 and 186 in both diode gates are connected through half wave rectifiers 192 and 193, to a load resistor 194. The two bidirectional diode gates are constructed similarly with the exception that the diode rectifiers 185 and 186 in the two diode gates have their polarities reversed. For a more detailed description of the construction and operation of bidirectional diode gates, reference is made to the above identified Millman and Taub text, and in particular to page 438 thereof.

The modulating signals appearing across the load resistor 194 are coupled through a coupling capacitor 195 and amplitude control resistor 196 to the control grid of a cathode follower amplifier 197. The cathode follower 197 has its load resistor 198 coupled through a capacitor 199 to the control grid of electron tube 167 of the driver modulation circuit 127. The control grid of tube 167 is also connected across a potentiometer formed by a resistor 201 to provide grid bias for the control grid of driver modulator tube 167. The anode of electron tube 167 is connected to a voltage dividing network formed by a pair of parallel connected resistors 202 and 203 which have variable tap off points connected to the horizontal deflection electrodes 123, and are connected through a resistor 204 to a source of positive potential. The anode of electron tube 165 of the driver-modulated circuit 127 is also connected through a similar voltage divider network 202, 203 to a source of positive potential, with the voltage divider network 202, 203 being connected to the horizontal deflection electrodes 123 of the electron beam writing apparatus.

Upon placing the horizontal deflection circuit shown in FIG. 4 in operation, the 10,000 c.p.s. signal supplied from the master clock oscillator is connected through polarity reversing amplifier comprised by electron tube 151 and through the R-C coupling circuits 152 and 153 which differentiates the signal, and provides positive triggering pulse of short time duration to the control grid of electron tube 154. Electron tube 154 in conjunction with electron tube 155 and charging capacitor 156 comprises a boot strap sweep generator whose operation is synchronized by the incoming signal pulses supplied to the control grid of electron tube 154. The boot strap sweep generator thus comprised develops a saw tooth wave form voltage which is supplied across volume control resistor 163 and cathode follower amplifier 164 to the control grid of electron tube 165 in the driver modulator circuit 127 further comprised by electron tube 167. The wave shape of this basic saw tooth wave form voltage is shown in FIG. A of sheet 16 of the drawings. The intelligence contained in the data stored in the core shift register is modulated on this basic saw tooth wave form voltage by means of electron tube 167 of the driver modulator arrangement. The modulating signal containing this intelligence is supplied from the core shift register to the control grid of electron tube 171 of monostable multivibrator 133 further comprised by electron tube 172. The monostable multivibrator is in a normal zero (0) producing condition wherein the electron tube 171 is normally conducting and an output switching potential is developed across the cathode load resistor 182 of cathode follower amplifier 181. Under these conditions, the monostable multivibrator opens the diode gate associated with the 1.6 megacycle crystal oscillator 131 to supply signals from that oscillator through half wave rectifier 192 to load resistor 194, to cathode follower amplifier 198 and thence to the control grid driver-modulator tube 167. Accordingly, when there is no data supplied from the core shift register, or when the numeral in the data being supplied from the core shift register is a zero (0), the 1.6 megacycle crystal oscillator is connected out through the diode switch associated therewith to the control grid of driver-modulator tube 167. Since driver-modulator tubes 165 and 166 have a common cathode load resistor 166, the 1.6 megacycle oscillation is modulated on the wave front of the saw tooth wave form voltage supplied from the saw tooth generator 128. Upon the occurrence of a one (1) in the data supplied from the core shift register, monostable multivibrator 133 is caused to change from its stable state of operation wherein electron tube 171 is conducting, to its unstable operating condition, wherein electron tube 172 is conducting. As a result, the cathode follower amplifier 181 is cut off, and a switching potential is supplied across the load resistor 184 of the cathode follower amplifier 183 connected to electron tube 171. This switching signal is supplied to each of the bidirectional diode gates 129 so that the diode gate associated with the 1.136 megacycle crystal oscillator 132 is opened, and the diode gate associated with the 1.6 megacycle oscillator is closed The output signal from the 1.136 megacycle crystal oscillator 132 is then coupled through the half wave rectifier 193 and load resistor 194, and across the amplitude control resistor 196 to the cathode follower amplifier 197, and to the driver-modulator tube 167. Accordingly, it can be appreciated that the driver-modulator tube 167 has supplied to it a series of signals which are alternately one or the other of the two frequencies 1.6 megacycles or 1.136 megacycles depending upon the data supplied to the monostable multivibrator 133 from the core shift register. The wave form of such a series of signals is illustrated in graph B, sheet 16 of the drawings. It should be understood that graphs A and B are entirely different time bases as can be appreciated from consideration of the fact that they represent signals having widely different frequencies. Graph C of the drawings portrays a more realistic picture of the relationship of the saw tooth wave form sweep voltage supplied from the boot strap sweep generator 128, and the series of two different frequency modulating signals supplied from the crystal oscillators 131 and 132, for it is anticipated that some 32 different bits of data may be modulated upon one wave front of the saw tooth wave form voltage supplied from the boot strap sweep generator 128. This signal developed in the driver-modulator tubes 165 and 167 is provided to the phase splitting networks 202 and 203 where they are picked off and applied to the deflection electrodes 123. FIGURE C of sheet 5 of the drawings illustrates the wave shape of the resultant sweep voltage supplied by the driver-modulator to the deflection electrodes 123. This resultant wave shape allows the electron beam of writing apparatus, which has a rectangular or square cross section, to be swept across the surface of the thermoplastic film at a continuous rate depending upon the wave shape of the saw tooth wave form voltage supplied from sweep generator 128 and the modulating signals provide small plateaus on this basic saw tooth form potential, the spacing between which is dependent upon whether the 1.6 megacycle oscillator or the 1.136 megacycle oscillator is supplying the modulating signal. These small plateaus cause the writing electron beam to dwell at a particular point on the surface of the thermoplastic film for an instant of time longer than on the cross over points so that a sufficiently great charge of electrons is built up on the surface of the thermoplastic film, which, upon curing, will result in a grating, the spacing between which will be determined by the spacing between the plateaus on the sweep voltage wave front.

*Heating head control circuit*

The heating head control circuit 44 is shown in block diagram form in FIG. 5 of the drawings. Because all of the elements of the heating head control circuit are conventional in construction, and are described in any of the standard radio textbooks (for example see Reich, "Theory and Application of Electron Tubes," published by McGraw-Hill Book Company, 1944, New York, N.Y.), they have been illustrated in only block diagram form. The input trigger potential supplied from programmer 28 of the equipment is supplied to a pulse generator circuit 205 which has its output connected through a coupling circuit 206 to a gating 207. Gating circuit 207 is also connected to the output of a radio frequency oscillator 208, and operates to supply pulses of radio frequency energy of about 400 volts for a time duration of two-one hundredths of a second to the primary winding of an output transformer 209. Transformer 209 in turn has its secondary winding connected across the radio frequency heating electrodes 43 which serve to heat the thermoplastic film to a temperature of 100–150° centigrade.

*Vertical deflection writing circuits*

Figure 6:
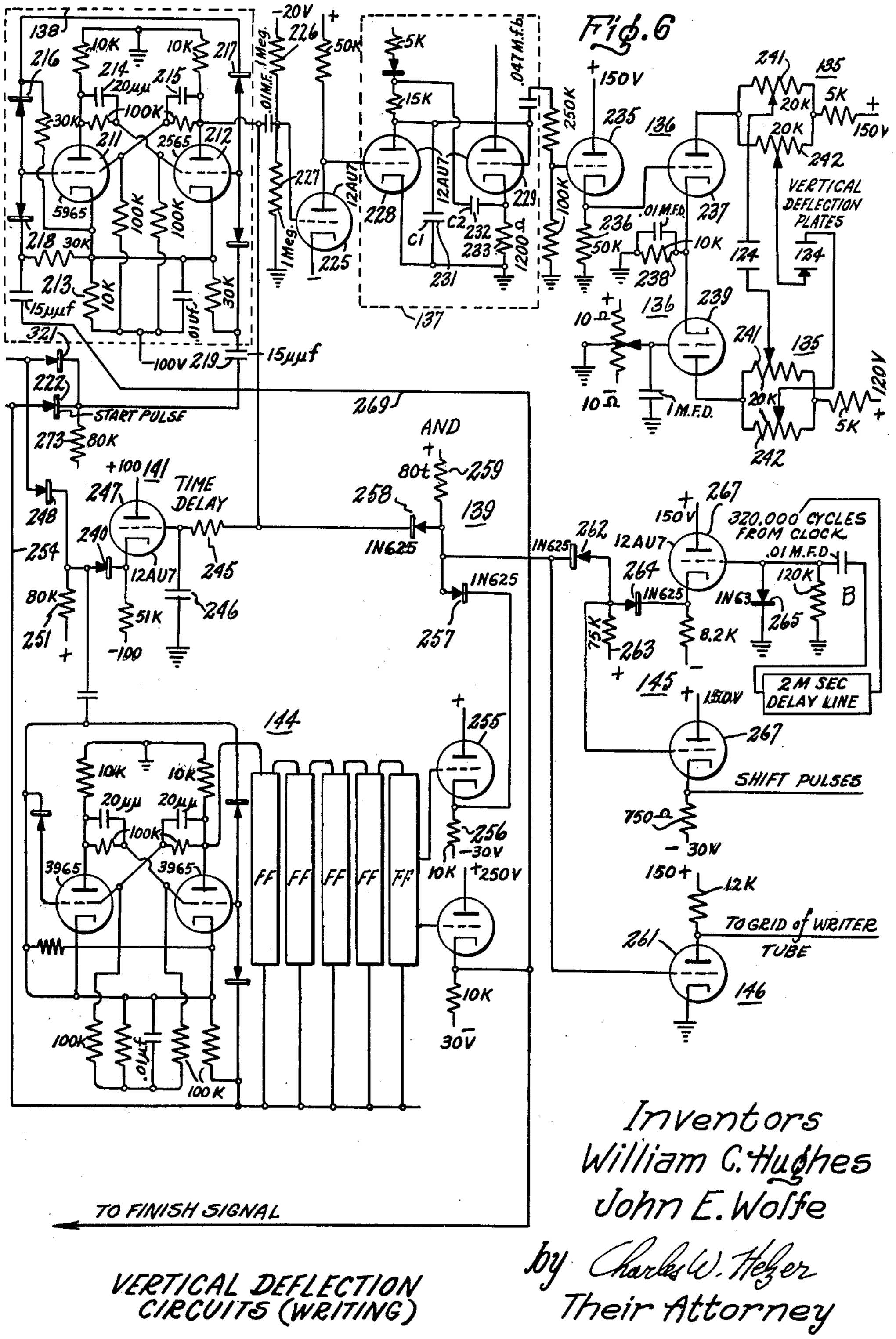
FIG. 6 is a circuit diagram showing the details of construction of the vertical deflection circuits used in the writing system of FIG. 3.

The details of construction of the vertical deflection circuits of the equipment are shown in FIG. 6 of the drawings wherein the vertical deflection plates of the electron beam writing apparatus are shown at 124. Operating potentials are supplied to the vertical deflection plates 124 from a boot strap sweep generator whose operation is controlled by a bistable multivbrator or flip flop amplifier 138 which is turned on by an incoming triggering pulse supplied from the 10,000 c.p.s. signal master clock oscillator not shown. The bistable multivibrator or flip flop amplifier 138 comprises a pair of electron tubes 211 and 212 which have the anode electrodes thereof connected through suitable plate load resistors to a source of positive potential (in this case ground) and the cathodes thereof connected through a common cathode resistor 213 to a source of negative potential. The anodes and control electrodes of each tube 211 and 212 are interconnected through resistance-capacitance charging networks 214 and 215, respectively, and the control electrodes of each of the electron tubes 211 and 212 have suitable biasing resistors connected thereto and to the source of negative potential. In addition, the control grid of each tube is connected to the junctions of a pair of opposed rectifiers 216 and a pair of opposed rectifiers 217, respectively, which form a triggering circuit for the flip flop amplifier. One set of rectifiers 216 is also coupled through a coupling capacitor 218 to the output of a divider network 144 to be described more fully hereinafter, and in addition is connected through a resistor to the cathode of electron tube 211. The remaining set of rectifiers is coupled through a coupling capacitor 219 to an and gate 143, and likewise has a resistor interconnecting one of the rectifiers in the set to the cathode of electron tube 212. The and gate 143 is formed by a pair of rectifiers 221 and 222 connected across a resistor 223 which is biased to a value such that both diode rectifiers 221 and 222 must have gating potentials supplied thereto in order to provide a positive going triggering output signal pulse to the bistable multivibrator 138. For a more detailed description of the construction and operation of diode and gates, reference is made to the above identified Millman and Taub text and in particular to page 397 thereof. Because of and gate 143, a triggering pulse is not supplied to bistable multivibrator 138 until the occurrence of both the start pulse from the programmer, and a clock pulse from the source of 10,000 c.p.s. oscillations supplied by the master clock oscillator. This arrangement assures that initiation of operation of the vertical voltage deflection circuit will be synchronized with the actuation of the horizontal voltage deflection circuits previously described. In its off condition, electron tube 212 of flip flop 138 is normally conducting, and the bias potential built up across the common cathode load resistor 213 is sufficient to maintain electron tube 211 in a nonconducting condition. Upon the occurrence of a positive triggering pulse supplied from the and gate 143 the cathode of electron tube 212 is driven positive thereby cutting the electron tube 212 off. Upon this occurrence, the positive bias supplied to the control electrode of electron tube 211 renders that tube conductive. This in turn builds up a positive bias across the common cathode resistor 213 which maintains electron tube 212 in a non-conducting condition. This results in driving the anode electrode of tube 212 positive and provides a positive going output potential to a resistance coupled amplifier 225 connected to the boot strap sweep generator 137. The anode of electron tube 225 is connected to the control grid of electron tube 228 which in conjunction with electron tube 229 forms a boot strap sweep generator for developing a saw tooth wave form vertical sweep potential. The boot strap sweep generator 137 is free running; however, its operation is initiated or triggered by the negative potential supplied to the control grid of electron tube 228 from flip flop 138 and amplifier 225. The boot strap sweep generator 137 includes a charging capacitor 231 connected between the plate and cathode of electron tube 228, and a feed back connection through a coupling capacitor 232 from a cathode resistor 233 connected in the cathode circuit of electron tube 229. With this arrangement, the electron tube 228 is normally conductive until such time that it is rendered nonconductive by electron tube 225 becoming conductive and dropping its plate potential and hence the control grid voltage of tube 228 below the cut off point of electron tube 228. Upon this occurrence, capacitor 231 starts charging through the feed back path including coupling capacitor 232 and the plate load resistor of electron tube 228 at a linear rate depending upon the time constants of the circuits. This time constant is chosen for a period of time sufficient to allow 32 horizontal scans and results in the production of a saw tooth wave form vertical sweep potential that is applied across a voltage divider resistor 234 to the control grid of a cathode follower amplifier 235. Cathode follower amplifier 235 has its cathode load resistor 236 coupled to the control grid of a driver amplifier tube 237 which has its cathode connected to a resistor 238 connected in common with the cathode of an electron tube 239 so as to form a phase splitting device. The control grid of electron tube 239 is connected to a grid biasing potentiometer, and the plate circuits of each of the electron tubes 237 and 239 have voltage dividing networks formed by two parallel connected resistors 241 and 242 connected thereto and through an additional voltage dropping resistor to a source of positive potential. The saw tooth wave form voltage produced by sweep generator 137 is amplified by tubes 237 and 239 and supplied across each of the resistors 241 and 242 in the voltage dividing network to which the vertical deflection plates of electron beam writing apparatus are connected.

The positive triggering potential produced by the flip-flop amplifier 138 is also supplied through a time delay circuit formed by a resistor and capacitance network 245 and 246 and electron tube 247 to an and gate rectifier 249. The time delay circuit is designed to delay the signal pulse for a period of time equal to one cycle of operation of the 10,000 c.p.s. signal source before applying the same to the and gate 142 formed by diode rectifiers 248 and 249 and resistor 251. Opening of the and gate 142 allows subsequent signal pulses from the 10,000 cycle per second master clock oscillator signal source to be applied to the input of the first flip flop amplifier in a divider network 144 formed by six such flip flops and capable of dividing the 10,000 c.p.s. pulses by a factor of thirty-two (32). The flip flop amplifiers in divider network 144 are identical in construction and operation to the flip flop amplifier 138 and, therefore, will not be described in detail. It is believed sufficient to point out that the series of flip flop amplifiers 144 are all placed in the zero condition by the application of a start pulse supplied through conductor 254 from the programmer. The subsequent application of the horizontal sweep frequency counting pulses from the 10,000 c.p.s. signal source to the first one of the series of flip-flop amplifiers serves to trip divider network into the first of its 32 stable conditions of operation.

Upon the divider network 144 being placed in the zero condition by the start pulse from the programmer, a gating potential is provided at the output of the divider which is supplied to a cathode follower amplifier 255 and appears across its cathode load resistor 256. The potential appearing across the cathode load resistor 256 is supplied to an and gate 139 formed by diode rectifiers 257 and 258 and a load resistor 259. The diode rectifier 258 already has a positive potential from flip flop amplifier 138 applied to it so that upon the application of a positive potential to rectifier 257 from cathode load resistor 256, and gate 139 opens. Opening of the and gate 139 produces a positive voltage pulse which is coupled to the control grid driver amplifier tube 261 whose plate load resistor is connected to the grid of the electron beam writing apparatus. The positive potential pulse supplied by and gate 139 is also applied across a rectifier 262 of and gate 145 which further includes a load resistor 263, and a diode rectifier 264. The diode rectifier 264 has supplied thereto positive signal pulses from the 320,000 c.p.s. master clock oscillator through a cathode follower amplifier 266 having a grid coupling circuit comprised by a diode rectifier 265 and resistance-capacitance coupling network. The cathode resistor of cathode follower amplifier 266 is connected to diode rectifier 264 so that upon coincidence of the potentials applied to the two rectifiers 262 and 264, the and gate 145 opens and applies the 320,000 c.p.s. shift pulses to the control grid of a cathode follower amplifier 267. The cathode follower 266 is in turn connected to the core shift register 29, not shown, so that the 320,000 c.p.s. shift pulses from the master clock oscillator can be used to read out data stored in the core shift register. The data thus read out is then supplied to the switch driver circuit of the horizontal deflection circuit previously described to thereby modulate the data as intelligence on the horizontal sweep voltage.

The vertical deflection circuit operates to provide a saw tooth wave form sweep potential to the vertical deflection electrodes 124 of the electron beam writing apparatus. The initiation of this vertical sweep potential is synchronized with the initiation of the horizontal sweep potential by the and gate 143 which triggers bistable multivibrator 138. The triggering of bistable multivibrator 138 supplies an operating potential to the boot strap sweep generator 137 and causes that circuit to initiate the development of the saw tooth wave form sweep potential. This sweep potential is supplied to the driver amplifier tube 239, and to the phase splitting resistor networks 241 and 242 which are connected to the vertical deflection electrodes 124 of the electron beam writing apparatus. Simultaneously, the potential produced by the bistable multivibrator 138 is applied through delay circuit comprised by amplifier tube 247 to the and gate 142. This potential is also supplied to the rectifier 258 of and gate 149. The first and gate 142 also has supplied to it signal pulses from the 10,000 c.p.s. source of oscillation so that and gate 142 opens, and applies the 10,000 c.p.s. signal pulses from the master clock oscillator to the input of the divide by 32 circuit 144. Previously divider 144 had been conditioned for operation by a start pulse from the programmer supplied through conductor 254 so that a positive output potential is produced across the cathode load resistor 256 which together with the potential supplied from bistable multivibrator 138, opens and gate 139 and applies an operating potential to the control grid of amplifier 261 connected to the control grid of the electron beam writing apparatus. Operating potential is also supplied to the and gate 145 so that signal pulses from the 320,000 cycle master clock oscillator source can be applied through cathode follower amplifier 267 to the core shift register. With the deflection circuits thus conditioned, the vertical deflection voltage sweep generator 137 will continue to operate while the horizontal deflection voltage sweep generator runs through 32 cycles of operation. Upon completion of the 32 horizontal scans, the divide by 32 circuit 144 produces an output potential which is supplied to the programmer to indicate that the writing circuit has completed writing a table of data. This output potential is also supplied through the conductor 269 in bistable flip flop 138 to return it to its initial state. The vertical deflection circuit will then have completed one cycle of operation, and the circuit is in condition to receive another start signal from the programmer.

*Reading system block diagram*

Figure 7:
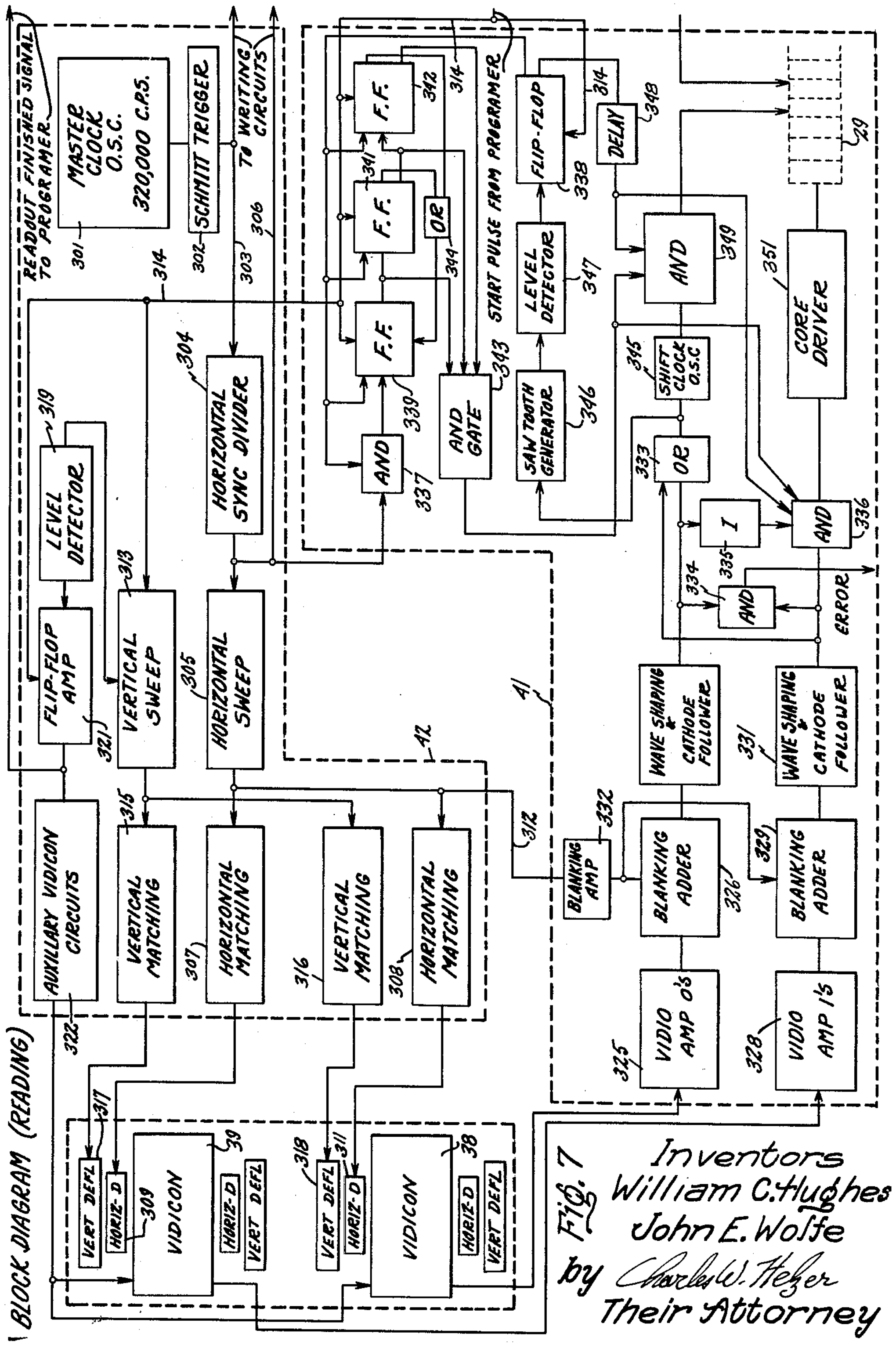
FIG. 7 is a functional block diagram of the reading system comprising a part of the drum data storage equipment shown in FIG. 1.

In order to read out data which has been formed on the thermoplastic film surface of the drum 11 in the previously described manner, a pair of read out vidicons 38 and 39 are provided as shown in the functional block diagram of FIG. 7 of the drawings. Each of the read out vidicons 38 and 39 have sweep potentials supplied thereto which are initiated from a 320,000 c.p.s. master clock oscillator 301. The output of the master clock oscillator 301 is supplied to a wave shaping trigger circuit 302. The output of the wave shaping circuit 302 is connected through a conductor 303 to the writing circuits previously described, and to the input of a horizontal synchronizing voltage divider network 304. The divider network 304 serves to divide the frequency of the signal supplied thereto from the master clock oscillator by a factor of 32, and provides an output signal having a frequency of 10,000 cycles per second which is connected to the input of a horizontal sweep generator 305 for the purpose of synchronizing the operation of the sweep generator 305. The output from divider network 304 is also supplied through conductor 306 to the writing circuits, and to the input of a trace rejection logic circuit to be described more fully hereinafter. A horizontal sweep generator 305 develops a saw tooth wave form output potential which is connected through a pair of matching networks 307 and 308 to the horizontal deflection coils 309 and 311 of vidicons 39 and 38, respectively. The output potential developed by horizontal sweep generator 305 is also connected through a conductor 312 to the output logic circuits for a purpose to be described hereinafter. Vidicons 38 and 39 have a vertical sweep potential supplied to the deflection coils thereof from a vertical sweep generator 313 whose input is connected through a conductor 314 to the programmer of the equipment which provides an energizing start pulse to the vertical sweep generator. Vertical sweep generator 313 develops a saw tooth wave form vertical deflection voltage which it supplies through a pair of vertical matching networks 315 and 316 to the vertical deflection coils 317 and 318 of the vidicon tubes 39 and 38, respectively. The output potential of vertical sweep generator 313 is also supplied through a level detector 319 to a bistable multivibrator 321 which drives the auxiliary vidicon circuits 322 to turn on the read out beams of the tubes and the like for the purpose of energizing such circuits. The auxiliary vidicon circuits 322 are, of course, connected to each of the vidicons 39 and 38 for supplying power to the same.

The output signal pulses produced by the vidicons 38 and 39 are supplied to separate amplifying channels where they are amplified and shaped before being supplied to the core shift register in which the data being read out is temporarily stored for use by the computer of other apparatus with which the data storage is being used. The equipment is designed so that the vidicon 38 supplies output electrical signals having a pulse wave form representing zeros in that data being read out, to a video amplifier 325 whose output is connected through a blanking-adder circuit 326 to a wave shaping circuit and cathode follower amplifier 327. The vidicon 39 supplies a pulsed output signal representative of the ones contained in the binary data stored on the drum being scanned, and this signal is supplied to video amplifier 328, a blanking-adder circuit 329 to a wave shaping and cathode follower amplifier 331. As mentioned in the previous paragraph, the output signal from the horizontal sweep generator 305 is supplied through a conductor 312 and a blanking amplifier 332 which is connected to both of the blanking-adders 326 and 329. By this arrangement, it is possible to selectively gate open both of the channels in which the blanking-adder circuits 326 and 329 are included during the read out portions of the travel of vidicon electron beams. During the re-trace portions of the electron beam travel, the blanking-adder circuits 326 and 329 are cut off thereby assuring that no noise is allowed to be read into the core storage device 29. The output signal from both cathode follower amplifiers 327 and 331 is supplied to an or gate 333, and to an "and" gate 334 for developing an error signal in the event both cathode follower 327 and 331 supply an output signal simultaneously. In addition, the output of cathode follower amplifier 327 is connected through an inverter circuit 335 to an and gate 336, with the output of cathode follower 331 being supplied directly to and gate 336. The and gate 336 also has gating potentials supplied thereto from a trace rejection logic circuit which together with the output logic circuit controls the operation of the deflection circuits 42. This trace rejection logic circuit comprises an and gate 337 to which is supplied the horizontal synchronizing potential developed by a divider circuit 304 as well as a gating potential from a flip flop amplifier 338 that is set to its zero output condition by a start pulse signal supplied from the programmer. The output potential developed across and gate 337 is supplied to the first flip flop amplifier 339 in divide by five counter further comprised by flip flop amplifiers 341 and 342 and or gate 344. Each of the flip flop amplifiers 339, 341 and 342 have reset signal pulses supplied thereto from the programmer through conductor 314, and a start count signal from the flip flop amplifier 338. All of the flip flop amplifiers 339, 341 and 342 have their outputs connected to an and gate 343 and the last two flip flop amplifiers 341 and 342 have their outputs connected to an or gate 344 whose output is connected back to the input of the flip flop amplifier 339. By this arrangement, the three flip flop amplifiers which would normally count up to eight are caused to count only to five before opening the and gate 343. The potential developed across and gate 343 is applied to the and gate 336 connected to the output of cathode follower amplifier 331 in the ones (1's) channel, and also to an and gate 349 which is connected to the output of a shift clock oscillator 345*a* whose operation is synchronized by the incoming ones (1's) or zero (0) signal pulses supplied by cathode followers 327 or 331 through or gate 333. The output potential developed across or gate 333 is also supplied to the input of a saw tooth generator 346 having its output coupled to a level detector 347 which in turn is coupled to the input of flip flop amplifier 338, and controls the actuation of the same in conjunction with the start pulse supplied from the programmer. As previously mentioned, the flip flop amplifier 338 supplies an output start count signal to each of the flip flop amplifiers 339, 341, and 342 divide by five circuits. In addition, flip flop amplifier 338 supplies a second output signal through a delay device 348 to and gate 349, and to and gate 336. The output potential from and gate 349 is then supplied to shift register 29. Simultaneously, the and gate 336 is opened so that data may be supplied to the core driver 351 and thence to the core shift register 29 from the cathode follower amplifier 331.

Figure 19:
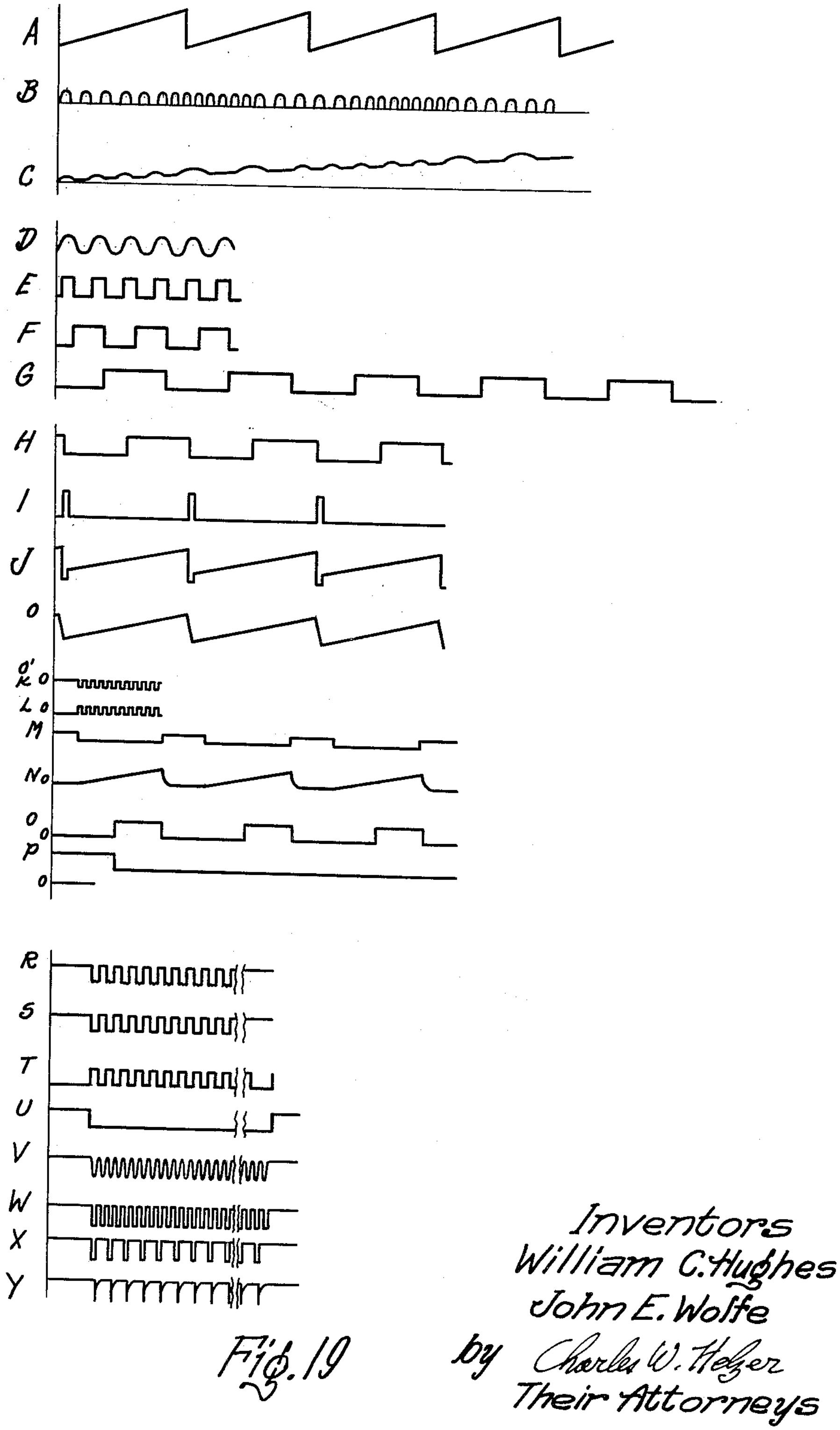
FIG. 19 shows a series of potential waveforms of the characteristics of the signals appearing at various points in the data storage equipment of FIG. 1.

In operation the master clock oscillator 301 supplies a triggering potential having a sinusoidal wave shape as shown at D in sheet 16 of the drawings to the wave shaping circuit 302 which develops a pulsed wave form potential shown at E on FIG. 19. This potential wave form is supplied to the horizontal synchronizing divider 304 which divides its frequency by a factor of thirty-two (32) in the manner illustrated by curves F and G of FIG. 19. The frequency dividing illustrated by curves F and G is performed five times by divider 304 to result in a 10,000 c.p.s. pulse wave form synchronizing potential that is shown at H on FIG. 19, and is supplied to the horizontal sweep generator 305. The potential shown at H on sheet 16 is converted to a short time duration pulse potential shown at I on sheet 16 by a multivibrator comprising a part of sweep generator circuit 305, which serves to trigger saw tooth generator to produce a saw tooth wave form sweep potential shown at J. This sweep potential is supplied through matching circuits 307 and 308 to the horizontal deflection coils 309 and 311 of vidicons 39 and 38, respectively, where it appears as shown at Q on FIG. 19. Simultaneously, the start pulse from the programmer is applied through conductor 314 to the vertical sweep generator 313 and initiates its operation. Concurrently, the flip flop amplifier 321 is actuated so that it supplies operating potential to the auxiliary vidicon circuits 322 thereby turning on the vidicons 39 and 38. The vertical sweep generator then applies its saw tooth wave form sweep potential somewhat similar in wave shape to curve Q in FIG. 19 of the drawings to the vertical matching circuits 315 and 316, and to the vertical deflection coils 317 and 318 of vidicons 39 and 38, respectively.

Figures 8, 9:
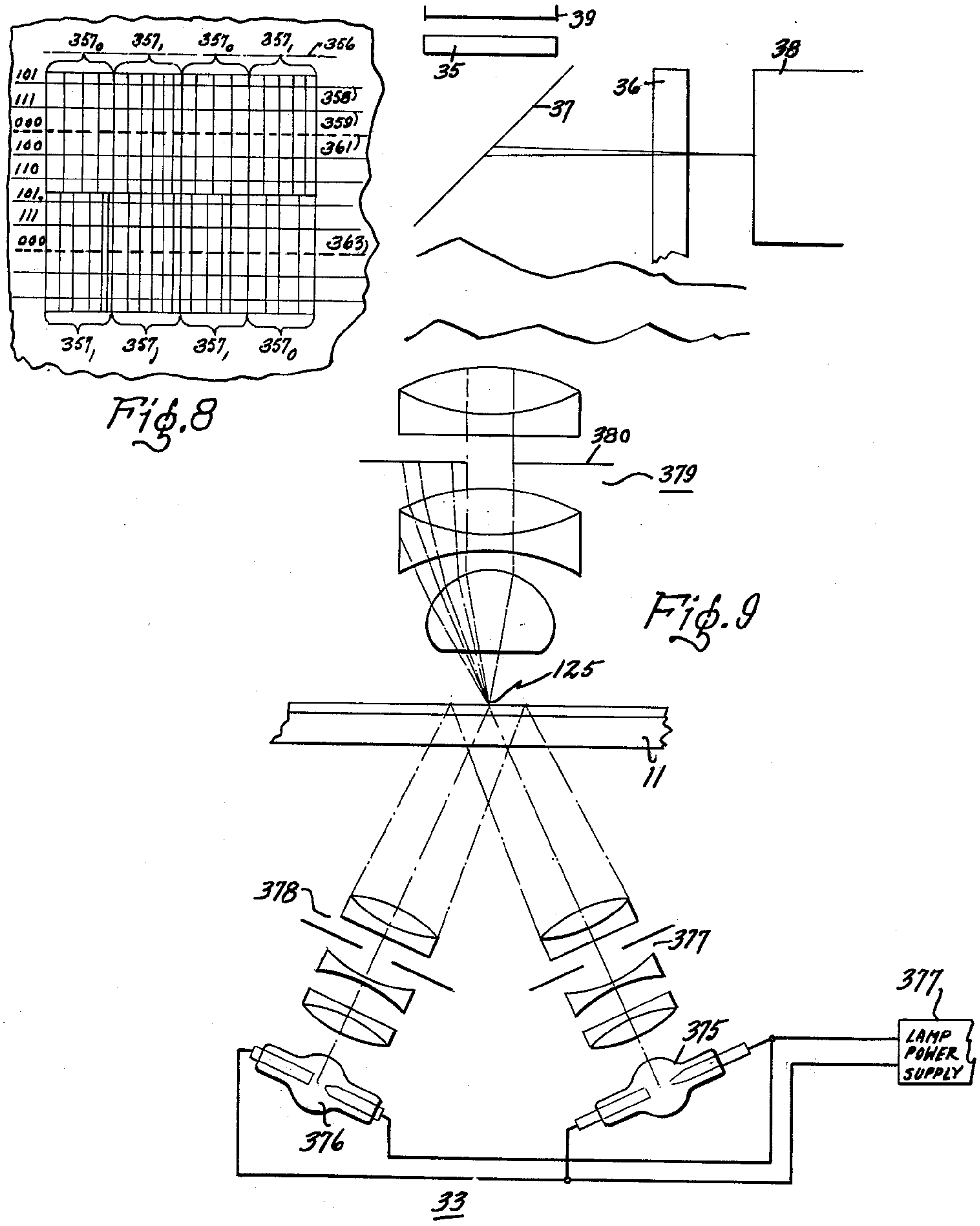
FIG. 8 is a fragmentary view of the thermoplastic film surface of the storage drum comprising a part of the drum data storage equipment shown in FIG. 1, and illustrates the manner in which data is written on the drum surface.
FIG. 9 is a functional block diagram of the parts of a readout system used in the drum data storage equipment of FIG. 1.

FIG. 8 of the drawings discloses a block of data bits as it would appear on a thermoplastic film surface on data storage drum 11. It should be understood that the gratings on surface 355 would not actually appear on the photosensitive cathode surfaces of the vidicon read out tubes 39 and 38 as shown in FIG. 8, but instead would appear to the vidicons as a series of different colored light spots with the light spots representing zeros being imaged on vidicon 38, and the light spots representing ones being imaged on vidicon 39.

For convenience in explaining the read out operation however, it will be assumed that the read out electron beams of the vidicons, which are rectangular in shape with a length sufficient to embrace one light spot produced by a grating or bit and pencil sharp, trace out the scan lines shown. The beginning trace of the scanning electron beam of each of the read out vidicons 39 and 38 is indicated by the dotted line 356. It can be appreciated that at the position 356 the scanning electron beam of the vidicon will not see any of the data information gratings or bits illustrated at 357. However, upon reaching the position shown by line 358, the read out electron beam will develop pulse wave form output signals which appear as shown at K and L on FIG. 19 of the drawings, and which will be supplied through either the amplifier 325 or 328 depending upon whether the block of data represents a zero (0) or one (1). Assuming the first block of data to represent a zero (0), then the initial signal pulse passes through the blanking adder 326 by reason of the fact that the horizontal sweep potential from the horizontal sweep generator 305 has been applied through the blanking-amplifier 332 and opened the blanking-adder 326. The signal pulse is then applied to wave shaping and cathode follower amplifier 327 and to or gate 333. Opening of the or gate 333 supplies operating potential having the wave form shown at M and U on FIG. 19 to saw tooth generator 346, and supplies a triggering potential to the shift clock oscillator 345 thereby actuating the shift clock oscillator to produce the sinusoidal shift signal shown at V on FIG. 19. Application of an operating potential to the saw tooth generator 346 initiates its period of operation to produce a saw tooth wave form potential shown at N on FIG. 19 so that as the electron beam of the vidicon scans across the data bit as indicated by the line at 358, the potential of the output voltage produced by saw tooth generator 346 reaches a level indicated by the dotted line sufficient to open level detector 347 which provides a square wave triggering potential shown in 0 to flip flop amplifier 338. Flip flop amplifier 338 then supplies an output potential shown at P through delay device 348 to the and gate 345, and to the and gate 336. Flip flop amplifier 338 also supplies a pre-count set signal of two to the divider network formed by the three flip flop amplifiers 339, 341 and 342. This pre-count set signal conditions the divider network so that it will count only to three pulses before opening the and gate 343, and this is achieved by partially setting the flip flop amplifier 342 to provide operating potential to and gate 343. Finally, the flip flop amplifier 338 supplies operating potential to the and gate 337 so as to open that gate and apply the synchronzing pulses from network 304 to the first flip flop amplifier 339 in the divider network. Application of these synchronizing pulses from circuit 304 to flip flop amplifier 339 causes it to change to the second of its two stable states of operation so that it counts one of the total of three stable states of operations of which the divider network is further capable of counting to. Upon starting a new line of scan indicated at 359, flip flop amplifier 341 will be actuated so as to provide an operating potential to and gate 343, and upon reaching the third or middle line of scan 361, flip flop amplifier 339 will supply an operating potential to the and gate 343. And gate 343 then opens and provides an operating potential to and gates 347 and 336. As a result, and gate 345 opens and allows the shift signal shown at V from the shift clock oscillator 344 to be supplied to the shift pulse generator 349 to produce the shift pulses shown at W on sheet 16 which drive the core shift register. Concurrently, the and gate 336 opens so that data appearing in the one (1) channel and having the wave form shown at R on FIG. 19 of the drawings is supplied to the wave shaping circuit 331 where it is squared to appear as shown at S on FIG. 19. The squared pulse potential S is then supplied through and gate 336 where it appears as shown at X on FIG. 19 and is supplied to the core driver 351. Core driver 351 then converts the signal to short duration pulses shown at Y for driving the core shift register. It should be noted that the output potential from the cathode follower 327 in the zero channel shown at T in FIG. 19 of the drawings is supplied through an inverter circuit 335 to operate and gate 336, and that the negative going signal pulses supplied from vidicon 38 to video amplifier 325, blanking-adder 326, and cathode follower 327 of the zero (0) channel are not provided to drive the core driver 351. By this arrangement, the negative going signal pulses representing the zero (0) will be inverted by inverter 335 so that and gate 336 does not open. This feature assures that no data producing potential will be provided to the core driver, and that no signal will be supplied to data read in coils on the core shift register, and, accordingly, the shift pulses supplied from the shift pulse generator 349 will shift through a blank space in the line of digital data which will represent the zero. The negative going signal pulses supplied from vidicon 339 which represents ones (1's) in the data being read out from drum 11 are supplied through and gate 336 to core driver 351. And gate 336 will be opened since there is no potential appearing at the output of cathode follower amplifier 327 in the zero's channel, and inverter 335 will operate to provide a potential to open and gate 336. Accordingly, the negative potential pulses representing the ones (1's) in the data will be supplied to the core driver 351 and will be read into the core shift register resulting in the storage of a series of zeros and ones within the register. In the event of the occurrence of simultaneous negative going potential pulses in the output of both cathode follower amplifiers 327 and 331, the and gate 334 will be opened indicating an error, and inverter circuit 335 will function to keep the and gate 336 closed so that no data will be recorded on the shift register. Accordingly, in the case of errors, it is known that the error will appear in the data in the core shift register in the form of a zero. Upon completion of reading out of a line of data which will include 32 of the blocks 357 each having the characteristic spacing between its gratings depending upon whether it represents a zero or a one, the scanning electron beam is returned back to its start position by the saw tooth wave form sweep potential supplied from sweep generator 305. Initiating a new line of scan, however, produces a pulse in the output of synchronizing circuit 304 which changes the operating condition of the first flip flop amplifier 339, and results in closing and gate 343 and and gate 349. Consequently, no data will be read into the core shift register on this trace. Since the divider network represented by the flip flop amplifiers 339, 341 and 342 is a divide by five network, it is necessary to pulse the flip flop amplifiers five times before the and gate 343 will again be opened. From FIG. 8 of the drawings it can be seen that the read out electron beam will run through five traces down to line 363 prior to and gate 343 being opened and that this will result in positioning the read out beam in the center of the next line of data 357 to be read out. The read out cycle is repeated and the line will be read out throughout the entire block of data. Upon the vertical position of the read out electron beam reaching a point where 32 lines of data bits have been read out, the saw tooth wave form sweep potential from the vertical sweep generator 313 reaches a magnitude which is sufficient to actuate level detector 319, and turn off flip flop amplifier 321. This action results in supplying a read out finished signal to the programmer, and de-energizing the auxiliary vidicon circuits thereby completing reading out the block of data representing $32 \times 32$ bits of information. It is, of course, understood that there are some $1,000 \times 1,000$ blocks of such data bits on the surface of the drum, hence it is capable of storing $1,000 \times 1,000 \times 32 \times 32 = 1,024,000,000$ or over a billion bits of information.

FIG. 9 of the drawings discloses the mechanical arrangement of the vidicon tubes 38 and 39 with respect to the light source 33. Light source 33 comprises a pair of two mercury light sources 375 and 376 which are capable of radiating two distinct color lights simultaneously, and which are connected across a lamp power supply source 377. As illustrated schematically in sheet 1 of the drawings, the mercury lamps 375 and 376 are positioned within the interior of drum 11 at symmetrical angles of about 23.6 degrees with respect to a vertical line passing through a focal point on the surface 125. Light from each of the two color light sources 375 and 376 is collimated by a respective condenser lens assembly 377 and 378 and directed upon the under surface of the drum 11. The drum 11 is constructed of a transparent material, and has a thermoplastic film surface 125 secured thereto. Light from the two color light sources 375 and 376 passes through the drum surface 11 to the thermoplastic film where it is refracted in accordance with the refraction gratings formed thereon by electron beam writing apparatus in the previously described manner. Gratings will be approximately 5 x 5 microns in dimension with grating spacings (i.e., the distance between the lines or bars making up the gratings) of one (1) micron for a one (1) grating and 1.41 microns for a zero (0) grating. For these spacings the ones (1's) gratings or bits will yield a blue light signal, and the zeros (0's) a yellow light signal. The different colored light signals are collected by objective lens assembly 379 which includes a rectangular aperture 380 having a long dimension parallel to the diffraction grating lines or marks. The small dimension of the rectangular aperture limits the resolving power of the assembly, and has been selected to resolve details as fine as five microns. The different color light signals collected by the objective lens assembly 379 is then imaged on half-silvered mirror 37 which selectively passes light through color filter 35 to vidicon 39, or through color filter 36 to vidicon 38.

Figures 10, 11:
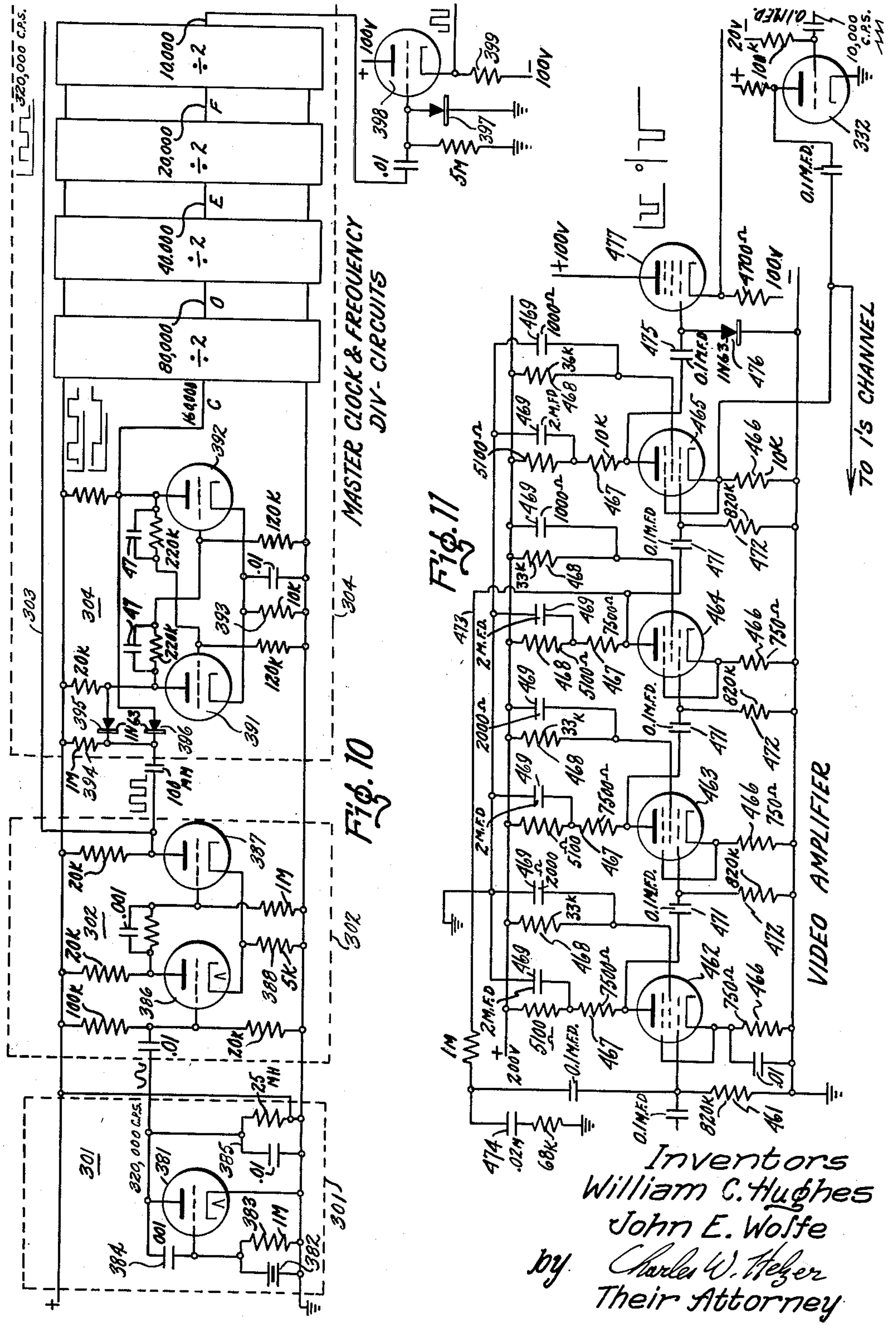
FIG. 10 is a circuit diagram showing the master clock and frequency dividing circuits of the reading system shown in FIG. 7.
FIG. 11 is a circuit diagram of a video amplifier comprising a part of the reading system shown in FIG. 7.

The details of construction of part of the read system is shown in FIG. 10 of the drawings. The master clock oscillator 301 of the system comprises a triode electron tube 381 having its control grid connected to a frequency determining circuit comprised by a piezo electric crystal 382 connected across a resistor 383. The anode electrode of electron tube 381 is connected through a suitable plate load resistor to a source of positive plate potential and through feed back capacitor 384 to the control grid. An output load circuit comprised by a resistance-capacitance network 385 serves to couple the output signals generated by the oscillator to the remainder of the system. For a more detailed discussion of the construction and operation of crystal control oscillators, reference is made to any of the standard texts, for example see the textbook entitled "Active Networks" by Vincent C. Rideout, published by Prentice-Hall Company, New York, 1954, page 273. The frequency determining circuit of master clock oscillator 301 is set to provide an output signal of 320,000 c.p.s. which is supplied to the control grid of an electron tube 386 by a suitable coupling capacitor and voltage dividing network comprised by a pair of series connected resistors. Electron tube 386 has its cathode connected to ground through a common cathode resistor 388 with an electron tube 387, with the anodes of both tubes being connected to a source of positive plate potential through suitable plate load resistors. The anode of electron tube 386 is connected through a parallel connected resistor-capacitor charging network to the control electrode of electron tube 387 which is returned to ground through a grid resistor. The circuit thus comprised constitutes a cathode coupled bistable multivibrator, and functions as a wave shaping circuit for converting the sinusoidal wave form potential supplied from the master clock oscillator 301 to a square wave potential having the same frequency as the oscillations produced by master clock oscillator 301. The square wave potential supplied from the bistable multivibrator 302 is coupled to the input frequency divider network 304 which comprises a series of five bistable multivibrators which perform the function of dividing the frequency of the square wave output signal produced by bistable multivibrator 302 by a factor of 32 to result in an output signal having a frequency of 10,000 c.p.s. Each of the bistable multivibrators in the frequency divider network 304 comprises a pair of electron tubes 391 and 392 whose cathodes are connected through a common resistor 393 to ground, and whose anodes are connected through suitable plate load resistors to a source of positive potential. The anodes and control electrodes of each of the electron tubes 391 and 392 are interconnected through parallel resistance-capacitance charging networks, and the control grid of each of the electron tubes is returned to ground through a suitable grid resistor. The square wave potential supplied from the wave shaping circuit 302 is applied across a load resistor 394 which is connected to the anode of electron tube 391 thru diode rectifier 395 and is connected to the anode of electron tube 392 thru a diode rectifier 396. The bistable multivibrator formed by electron tubes 391 and 392 function in a manner similar to bistable multivibrator 302 in that the cathode current drawn across the cathode resistor 392 maintains one of the tubes in a cut off position but differs therefrom in that positive triggering potentials are required on each of the anode electrodes in order to trigger the bistable multivibrator from one of its operating conditions to the other of its operating conditions. It is understood, of course, that by one operating condition is meant one of the electron tubes, for example 391 is conducting and 392 is cut off, while the other of the operating conditions would be represented when electron tube 392 is conducting and electron tube 391 is cut off. As a consequence of this construction, it takes two input pulses supplied from the wave shaping circuit 302 to trigger the first divider in the group and return it to its original condition to complete one cycle of operation. As a consequence, the frequency of the square wave signal supplied from the first of the bistable multivibrators in the divider network 304 will be divided by two. Similarly, the second bistable multivibrator will result in dividing the frequency of the signal supplied from bistable multivibrator 302 by a factor of four, the third by a factor of eight, the fourth by a factor of 16, and the fifth by a factor of 32, resulting in a square wave output potential having a frequency of 10,000 cycles per second. This output potential is supplied to the grid of a cathode follower amplifier 398. The master clock oscillator 301 produces a sine wave form potential illustrated at D on sheet 16 which is applied to the wave shaping bistable multivibrator 302 that converts the sine wave into a square wave output signal shown at E having the same frequency as the master clock oscillator of 320,000 c.p.s. This square wave potential is then applied to the input of the divide by 32 network 304, and graphs F and G depict the resulting potential wave forms produced by the first two bistable multivibrators in the divide by 32 circuit. From a consideration of graphs F and G, it can be appreciated that curve F has one half as many pulses as curve E, and hence is one half the frequency of curve E, and the wave form of curve G is one half the frequency of the wave form of curve F, and is one fourth the frequency of the wave form of curve E. This reduction in frequency is reproduced throughout the divider network resulting in the production of a 10,000 c.p.s. square wave form signal which is depicted by curve H on a greatly reduced time basis from the time basis of the wave forms shown in curves D–G.

*Horizontal sweep reading circuits*

Figure 12:
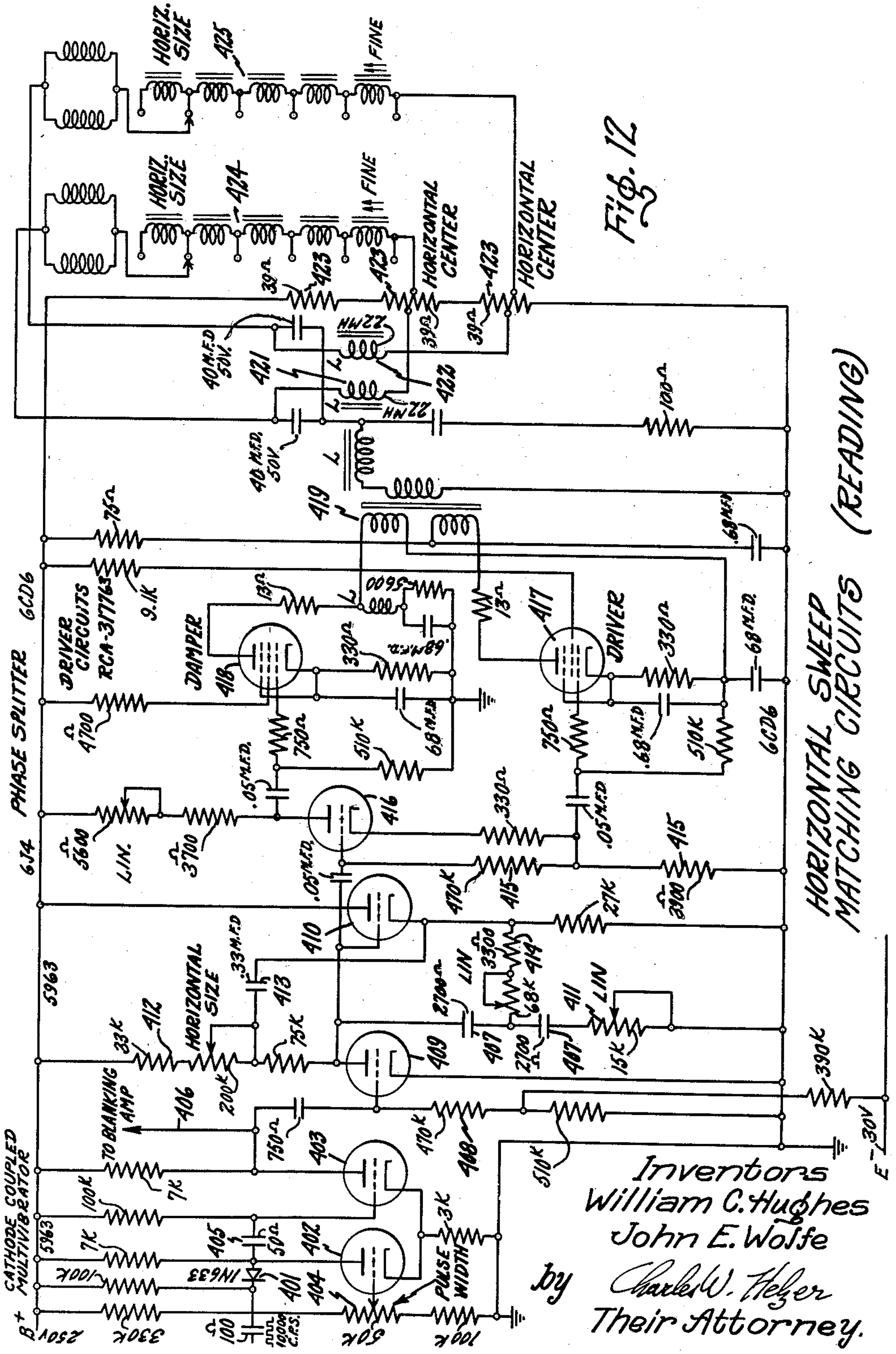
FIG. 12 is a circuit diagram of the horizontal sweep matching circuits comprising a part of the reading system shown in FIG. 7.

In FIG. 12 of the drawings, it can be seen that the 10,000 c.p.s. square wave from potential appearing at the output of the frequency divider network 304 is coupled through a rectifier 401 to the anode electrode of a cathode coupled monostable multivibrator comprised by electron tubes 402 and 403. The control electrode of electron tube 402 is connected to a variable tap point on a voltage dividing resistor 404 connected between ground and a source of positive potential, and the control grid of electron tube 403 is connected through a coupling capacitor 405 to the anode of electron tube 402. The anode of both electron tubes 402 and 403 are connected through suitable plate load resistors to a source of positive plate potentical B+, and the circuit is adjusted so that the electron tube 403 is normally conducting. Upon arrival of synchronizing signal pulse from the divider network 304, the pulse is coupled through decoupling rectifier 401, the plate of electron tube 402, and hence control grid of tube 403 which is driven sufficiently negative to drive 403 into cut off. This results in allowing electron tube 402 to be rendered conductive, and produces a positive output trigger pulse which is supplied through a conductor 406 to the blanking amplifier to be described hereinafter, and through a coupling capacitor to the control grid of an electron tube 409. The electron tube 409 has its cathode connected directly to ground and has a negative biasing potential supplied to the control grid thereof through a grid biasing resistor 408, and its anode connected through a variable resistor 412 to a source of positive plate potential. The anode of tube 409 is connected to a charging network comprised by capacitors 407 and a variable resistor 411 connected in series to ground, and a portion of the anode resistor 412 is coupled through a coupling capacitor 413 to the cathode of an electron tube 410. Electron tube 410 has its cathode connected to ground through a cathode resistor that is connected through a variable resistor 414 to the juncture of the capacitors 407.

In operation, short time duration positive going synchronizing pulses are supplied from monostable multivibrator tube 403 and applied to the control grid of electron tube 409, which is normally maintained non-conductive by the negative bias supplied from resistor 408 and renders tube 409 conductive for the duration of the short time trigger pulse whereupon tube 409 again becomes non-conducting. Upon electron tube 409 becoming conductive, its plate potential drops essentially to ground, resulting in discharging capacitors 407 and initiates the start of a saw tooth wave form potential built up across these capacitors. This saw tooth cycle starts initially at a point above ground because of the positive bias potential flowing in the charging circuit through resistors 411 and 412. As the capacitors 407 charge positively, tube 410 is rendered conductive, and as it commences to conduct, feed back coupling occurs through the coupling capacitor 413 to maintain a constant potential across the portion of plate load resistor 412 to which it is connected. This constant potential portion of load resistor 412 maintains a constant charging current to the capacitors 407 whose potential rises linearly in saw tooth wave fashion toward the potential of the B+ supply. This saw tooth wave form potential is then supplied through a coupling capacitor, and across a voltage dividing resistor network 415 to the control grid of an electron tube 416. Electron tube 416 has a cathode load resistor that is connected to the junction of the voltage dividing resistor 415, and a variable plate load resistor, and serves as a phase splitting network. This phase splitting network serves to develop two saw tooth wave form potentials which are applied to the control grids of a pair of pentode amplifier tube 417 and 418 whose anodes are connected in a damper-driven arrangement to the split primary windings of a power transformer 419. The amplifiers 417 and 418 are conventional power amplifiers which supply the high voltage saw tooth wave form potential through transformer 419 that has one secondary winding 421 connected through a resistor 423 of voltage to the horizontal deflection coils 424 of the vidicon tube 39. The secondary winding 422 likewise is connected through a resistor 423 of a voltage divider to the horizontal deflection coils 425 of vidicon 38. Hence, it can be appreciated that the horizontal sweep and matching circuit derives a high voltage saw tooth wave shape sweep potential, and applies this potential through a resistor matching network to the horizontal deflection coils of each of the vidicon tubes 38 and 39.

*Vertical sweep reading circuits*

Figure 13:
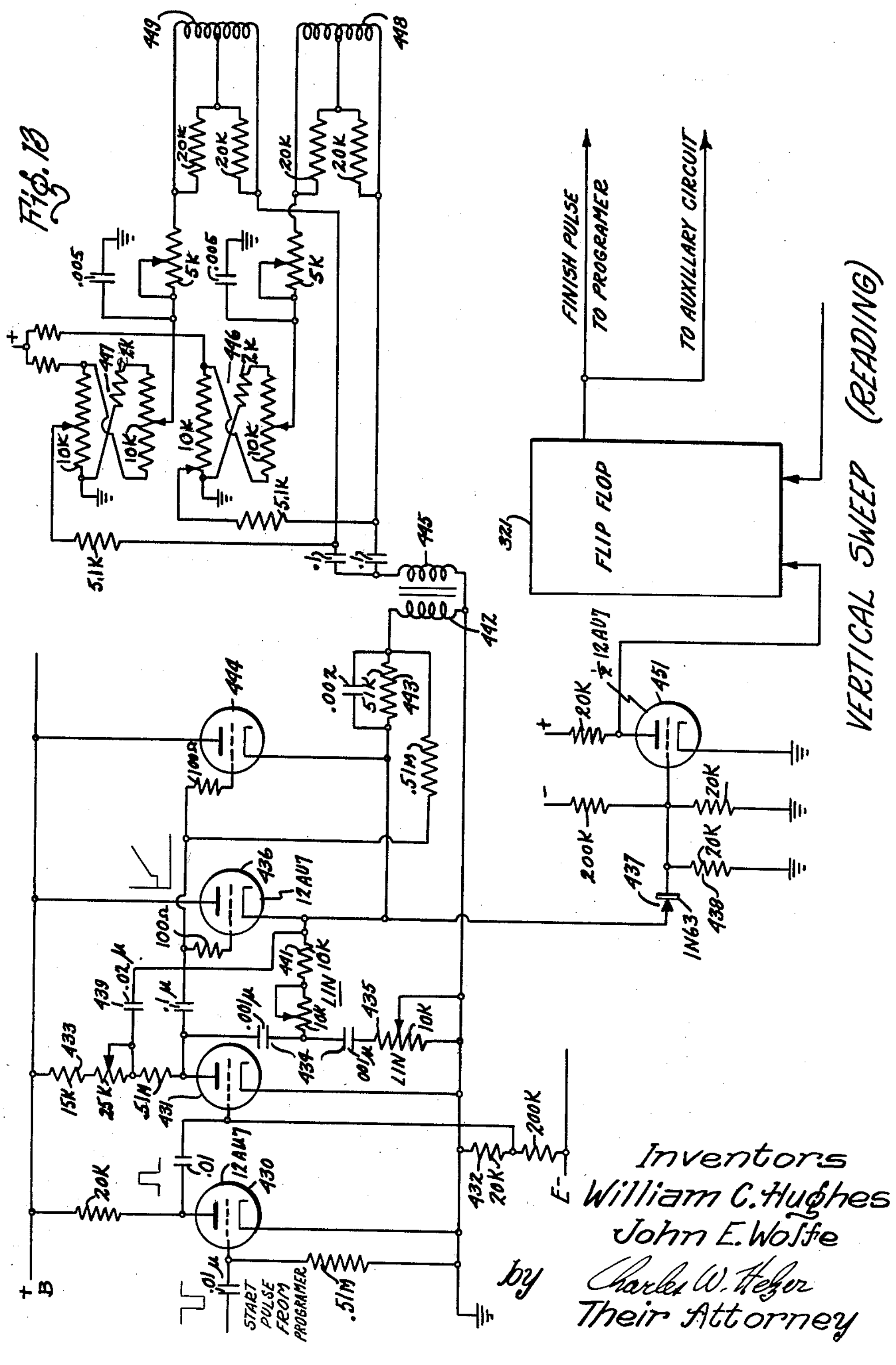
FIG. 13 is a circuit diagram of the vertical sweep matching circuits of the reading system shown in FIG. 7.

The vertical sweep deflection voltage generator circuits are shown in FIG. 13 of the drawings and comprise a conventional resistance-capacitance coupled amplifier tube 430 having its plate coupled through a capacitor to the control grid of a triode electron tube 431. Electron tube 431 together with an electron tube 436 comprises a boot strap sweep generator. A negative bias is supplied to control grid of triode 431 from a potentiometer 432, and its anode is connected through a variable resistor 433 to a source of positive plate potential. The variable plate resistor 433 together with a charging network comprising a capacitor 434 and variable resistor 435, form a grid biasing circuit for electron tube 436. The cathode of electron tube 436 is connected through a zener diode rectifier 437 to a load resistor 438 and through a coupling capacitor 439 back to an intermediate point on the plate load resistor 433 of electron tube 431. Additionally, there is a variable resistor 441 connected from the cathode of tube 436 to a junction point of the charging capacitor 434. The cathode of electron tube 436 is also returned to ground through the primary winding 442 of a precision transformer and through a bypass load resistor 443 in common with the cathode of a triode electron discharge tube 444. The control grid of electron discharge tube 444 is coupled back to the anode of electron tube 431 and through a suitable biasing resistor to a point intermediate the load resistor 443 and the primary winding 442. By this arrangement, the negative potential supplied from the potentiometer 432 to a control grid of electron tube 431 keeps it normally in a non-conducting condition. Upon the occurrence of the start pulse supplied from the programmer, the electron tube 431 is rendered conductive so that its plate potential drops and cuts off the electron tube 436. Subsequently, however, due to the bias potential supplied by the voltage divider formed by the plate load resistor 433 and charging capacitor 434, electron tube 436 commences to conduct, and feeds back a potential through coupling capacitor 439 which charges capacitor 434 linearly. The charge on the capacitor 434 then builds up linearly in a saw tooth wave form fashion, and is applied to the control grid of electron tube 444 which has the primary winding 442 connected in its cathode circuit. Electron tube 444 serves as a cathode follower amplifier to couple the saw tooth wave form potential to the primary winding 442. The secondary winding of the transformer 445 is connected in parallel to two resistor matching networks 446 and 447 which in turn are connected across vertical deflection coils 448 and 449, respectively, of the vidicon tubes 38 and 39. The matching networks 446 and 447 provide an adjustment for controlling the magnitude of the saw tooth wave form sweep voltages applied to the deflection coils 448 and 449 to thereby provide adjustment of the deflection of the read out electron beam of each of the vidicon tubes 38 and 39.

The saw tooth wave form sweep potential supplied to the matching network 446 and 447 is also applied to zener diode 437. Zener diode 437 has the characteristic of possessing a high forward resistance up to some predesigned breakdown potential which is chosen to be fairly high voltage so that the diode 437 does not become conductive until about the upper 10th of the saw tooth wave form potential developed by the sweep generator 431 and 436 is reached. Accordingly, upon the saw tooth wave form potential reaching this value, the zener diode 437 breaks down and develops a potential across load resistor 438 which is applied to the control grid of a resistance coupled amplifier 451. The resistance coupled amplifier in turn has its output connected to a conventional flip flop or bistable multivibrator 321 of the type described for example in connection with the master clock oscillator and frequency divider network shown on sheet 8 of the drawings. The bistable multivibrator 321 shapes the square wave potential produced by zener diode to develop a signal pulse that is supplied to the programmer to indicate that the vertical sweep potential has been completed, and is also supplied to the auxiliary vidicon circuits for cutting off the power supply to those circuits.

*Auxiliary vidicon circuits*

Figure 14:
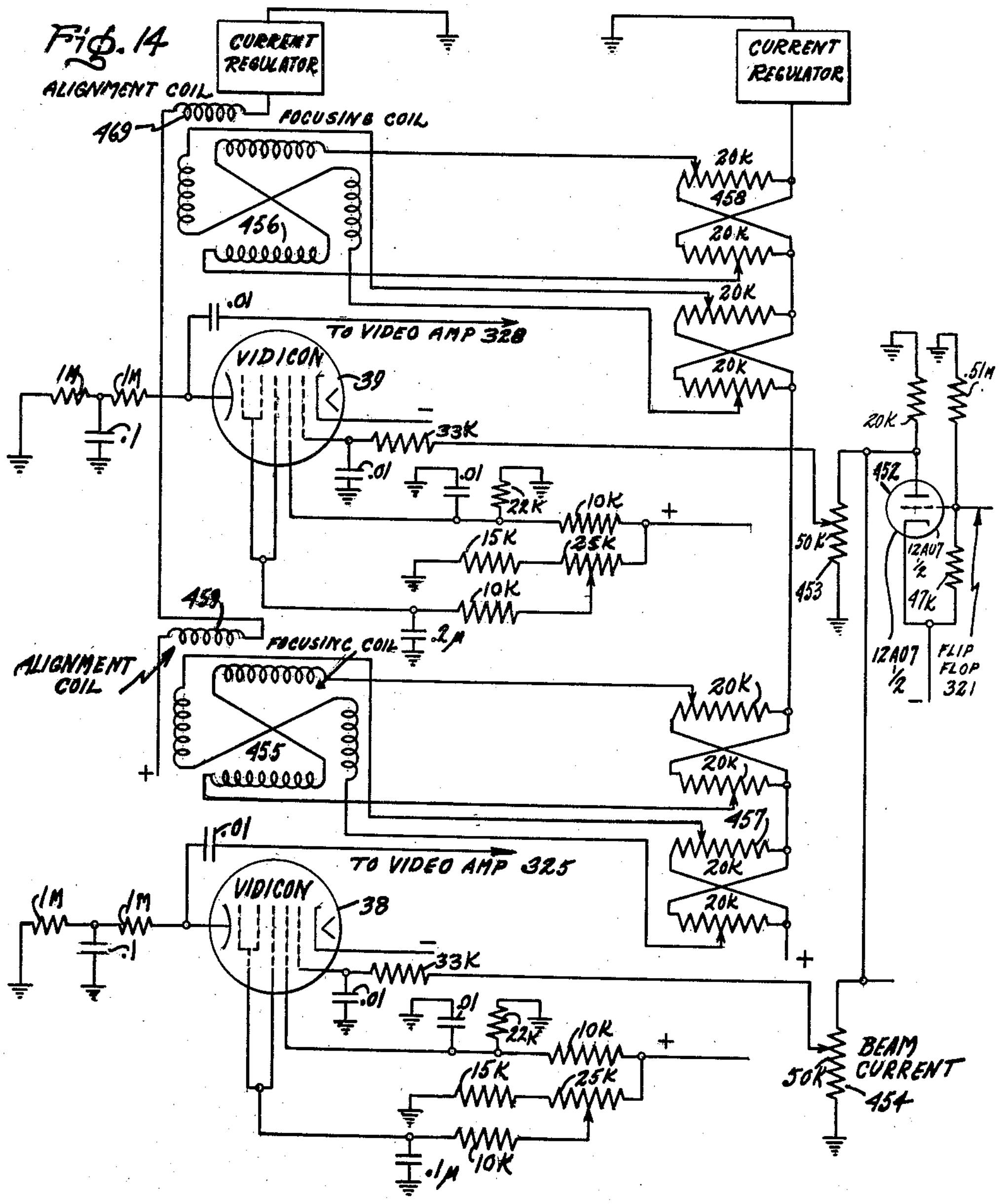
FIG. 14 is a circuit diagram of the auxiliary power supply circuits for the readout vidicons which comprise a part of the reading system shown in FIG. 7.

The auxiliary vidicon circuits are shown in FIG. 14 of the drawings wherein vidicon tubes 38 and 39 are shown schematically. The on-off control signals supplied from the flip flop amplifier 321 in the vertical deflection circuits is supplied across a grid load resistor of a resistance coupled amplifier 452 which has its anode connected to a pair of resistors 453 and 454 in parallel circuit relationship. The movable contact point on the variable resistor 453 is connected to the control grid of the vidicon read out tube 39 through a suitable resistance-capacitance smoothing network, and the variable contact point on the variable resistor 454 is connected to the control grid electrode of vidicon tube 38 through a suitable resistance-capacitance smoothing network. The accelerating electrodes of each of vidicon tubes 38 and 39 have operating potentials supplied thereto from separate sources of positive potential applied across respective voltage dividing networks as shown. The anode electrode of each of the vidicon tubes 38 and 39 is grounded through a load resistor across which the output signal developed by the vidicons appear, and is supplied to the respective video amplifiers 328 and 325 associated with each vidicon 39 and 38, respectively. The read out electron beams of each of the vidicons 38 and 39 are properly focussed by respective focussing coils 455 and 456 which are connected through variable resistance matching networks 457 and 458, respectively, and current regulating device to ground and to a source of positive potential. Also associated with each of the vidicon read out tubes 38 and 39 are alignment coils 459 and 469, respectively, which are connected in series relationship through a current regulating device to ground and to a source of positive potential. The matching networks connected to the focussing coils provide adjustment for the focus of the read out electron beams of the vidicons and the alignment coils provide a means for properly aligning the read out electron beams after focussing to center the beams. By adjustment of the variable resistors in the dividing networks connected to the accelerating electrodes of each of vidicon tubes 38 and 39, the potentials supplied to these electrodes can be adjusted prior to focussing and alignment to provide the desired electron beam current for proper read out. Data bearing signals read out by the vidicons are then supplied to the video amplifiers 325 or 328 of the system.

*Video amplifier*

The pulsed wave form electron signal representative of the zeros and ones in the data being read out by the vidicons 38 and 39 are supplied to video amplifiers 325 and 328 in the form of negative going signal pulses. Video amplifier 325 is shown in FIG. 11 of the drawings and is identical in construction to video amplifier 328. Hence, only video amplifier 325 will be described. The incoming pulsed wave form electric signal representative of the zeros is supplied across a resistance-capacitance coupling network 461, and is applied to the control grid of a pentode electron tube 462. The pentode electron tube 462 in conjunction with three additional pentode electron tubes 463, 464, and 465 comprises a four stage resistance-capacitance coupled video amplifier. Each of the stages of the amplifier includes a grid biasing resistor 466 connected in the cathode circuits of each of the tubes, and plate load resistor 467 connected to a source of positive plate potential. The source of positive plate potential is also connected through screen grid biasing resistors 468 to the screen grids of each of the pentodes, and both the screen grid resistor 468 and a portion of the plate load resistor 467 of each stage are bypassed to ground through suitable bypass capacitors 469. The suppressor electrodes of each of the tubes are connected directly to its cathode. The anode electrode of each of the pentodes is connected to the control electrode of the succeeding tube through a resistance-capacitance coupling network comprised by coupling capacitors 471 and resistors 472. In addition, the anode electrode of the third amplifier stage formed by pentode 464 is connected through a feed back connection 473 including a frequency compensating network 474 to the control electrode of the first stage amplifier pentode 462. This feed back connection provides a degenerative feed back for stabilization purposes. The cathode load resistor 466 in the last stage amplifier 465 has an input connection supplied thereto from the plate electrode of the blanking amplifier 332 which has supplied to the control electrode thereof the 10,000 cycle per second saw tooth wave form potential developed by the horizontal sweep generator 305 of the equipment, and functions to apply a gating pulse to the cathode load resistor 466 to the last stage amplifier 465. This gating pulse cuts off the video amplifier during the re-trace portions of the saw tooth wave form horizontal sweep potential. The output from the video amplifier is obtained from the plate electrode of the last stage pentode 465, and is coupled through a coupling capacitor 475, across a clamping diode 476 to the control grid of a cathode follower amplifier 477. The cathode follower output stage 477 is then connected directly across the input of the wave shaping and cathode follower circuit 327 to be described hereinafter.

*Output logic circuits*

Figure 15:
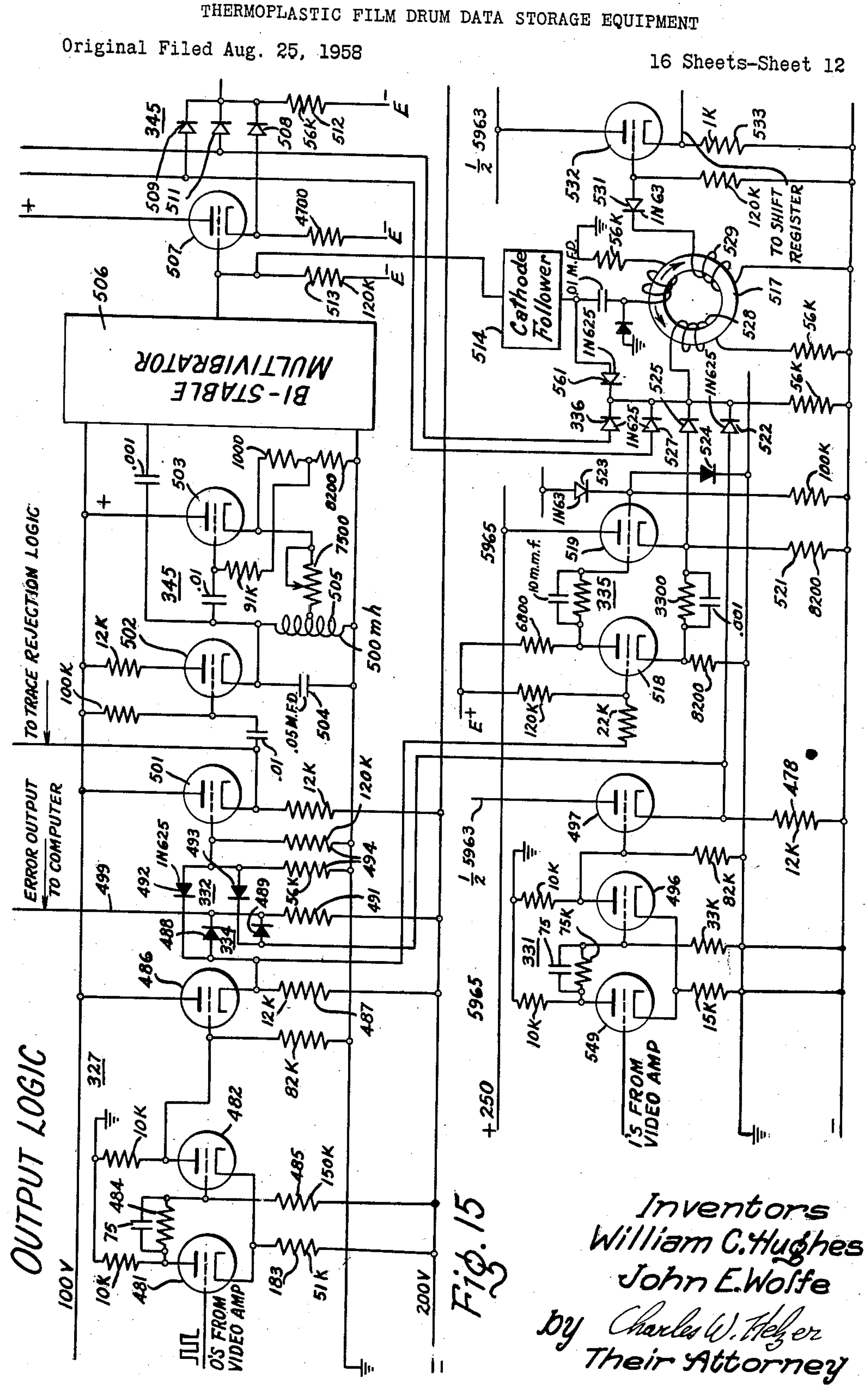
FIG. 15 is a circuit diagram of the output logic circuits comprising a part of the reading system shown in FIG. 7.

FIG. 15 of the drawings illustrates the output logic circuits wherein it can be seen that the amplifier output signal pulses representing the zeros in the data read out and amplified by video amplifier 325 are supplied to the control grid of electron tube 481 which together with an electron tube 482 comprise a cathode coupled Schmitt trigger circuit. Coupling between the two tubes occurs through a resistor 483, connected in common to the cathodes of both tubes and to a source of negative potential, and through a parallel resistance-capacitance coupling network 484 connected between the anode electrode of electron tube 481 and the control electrode of tube 482. The anode electrodes of both electron tubes are connected through suitable plate load resistors to a source of positive potential, in this case ground. In operation, electron tube 481 is normally conducting due to a positive bias applied to the control grid thereof from the cathode load resistor of the preceding cathode follower 477 of the video amplifier 325. When the input signal goes sufficiently negative to cut off electron tube 481, its plate voltage will begin to go more positive and will cause a corresponding rise in the grid voltage on tube 482 through capacitor 484. This increases the current through tube 482 which decreases the cathode voltage on the tube 481 rendering tube 481 less conductive, increasing its plate further, thereby regeneratively driving tube 482 full on for as long as the potential on the control grid of tube 481 maintains it non-conductive. Upon the control grid potential of tube 481 again going positive in response to the signal supplied thereto, tube 481 again becomes conductive and tube 482 non-conductive. This results in the production of a pulsed waveform potential in the anode circuit of tube 482 that follows the wave shape of the signal applied to electron tube 481. This improved wave shape signal is then supplied through cathode follower amplifier 486 to and gate 334 which comprises a pair of diode rectifiers 488 and 489, and a load resistor 491 connected to a source of negative potential. The pulsed output potential appearing across cathode load resistor 487 is also supplied to or gate 333 comprised by diode rectifiers 492, 493 and load resistor 494 which is connected to ground.

A second pulsed wave form data bearing signal is supplied from the video amplifier 328 which is representative of the ones contained in the data being read out by the vidicon tube 39. This pulsed wave form signal is supplied to the control grid of an electron tube 495 which together with a second electron tube 496 comprises a cathode coupled Schmitt trigger 331 which is identical in construction and operation to the bistable multivibrator 327 comprised by electron tubes 481 and 482. Bistable multivibrator 331 develops a square wave potential which follows the pulsed data bearing input signal supplied to it, and applies the improved wave shape signal to the control grid of cathode follower amplifier 497. The cathode load resistor 498 of cathode follower 497 is coupled to the diode rectifier 489 of and gate 334 and to the diode rectifier 493 of or gate 333. Accordingly, in the event that there is coincidence in the signal pulses applied to the and gate 334, an error signal will be supplied through conductor 499 to a suitable error indicating instrument not shown. However, when the equipment is functioning properly there should be no coincidence in the signal pulses applied to the and gate 334 so it should normally remain closed. Signal pulses supplied from either of the cathode followers 486 or 497 to the diode rectifiers 492 or 493, respectively, of or gate 333 are sufficient to open or gate 333. Opening of or gate 333 applies an operating potential to cathode follower amplifier 501 which in turn provides energizing potential to the trace rejection logic circuit to be described hereinafter, and to the shift clock oscillator 345. Shift clock oscillator 345 comprises an electron tube 502 which has its cathode connected to a tank circuit formed by a parallel connected capacitor 504 and inductance 505. The tank circuit 504 and 505 is connected in feed back relationship to an electron tube 503 to form a conventional Hartley oscillator, and is tuned to the bit clock rate of the equipment; namely, 320,000 c.p.s. The tank circuit is normally maintained in clamp by conduction through electron tube 502. However, upon application of a negative potential to the control grid thereof, the cathode load resistor of cathode follower amplifier 501 cuts off tube 502 and leaves the tank circuit free to oscillate. Shift clock oscillator 345 then breaks into oscillation and generates a sine wave potential having a frequency equal to the bit clock rate of 320,000 cycles per second. This sine wave is supplied to a Schmitt trigger 506 which is identical in construction to the Schmitt trigger 327 and functions in precisely the same manner to produce a square wave shift clock pulse output signal having the bit rate. The bit clock pulses produced by bistable multivibrator 506 are then supplied through a cathode follower amplifier 507 to a diode rectifier 508 of and gate 349 which further includes diode rectifiers 509 and 511, and a load resistor 512 connected to a source of negative potential. In addition, the bit clock pulses from bistable multivibrator 506 are supplied across a load resistor 513 to a cathode follower amplifier 514 connected in the one's channel circuitry. Cathode follower amplifier 514 is identical in construction to cathode follower amplifier 507 and has its cathode load resistor connected to a shift pulse read in coil 515 wound on a toroidal magnetizable core member 517 of permalloy, ferrite or some other suitable magnetic material, and to a rectifier 516 of and gate 336.

And gate 336 further includes a diode rectifier 522 connected directly to the cathode load resistor 498 of cathode follower amplifier 497 in the one's channel. Accordingly, data signal pulses appearing in the one's channel are applied directly to diode 522 of and gate 336.

The cathode follower amplifier 486 in the zero channel also has its cathode load resistor 487 connected to the control grid of an electron tube 518 which has its plate connected to the control grid of an electron tube 519, and forms the inverting circuit 335. Inverter 335 exhibits the characteristic of producing zero output voltage when a negative signal is applied thereto and a negative output voltage when zero potential is applied thereto. Accordingly, if there is a signal pulse applied to the control grid of electron tube 518, an output potential will be produced in the output of cathode of electron tube 519 which is the exact opposite in polarity to polarity of the signal applied to tube 518. The control grid of the electron tube 519 is also connected to a pair of voltage dividing diode rectifiers 523 and 524 which function to clamp the grid voltage to zero if it tends to be positive and to clamp it to the proper negatve value if it tends to be negative. The resulting output potential is then applied to diode rectifier 525 of and gate 336. And gate 336 further includes two additional diode rectifiers 526 and 527 which have enabling potentials supplied thereto from a trace rejection circuit to be described hereinafter. These trace rejection enabling potentials are also applied to the diode rectifiers 509 and 511 of and gate 345. Application of these enabling potentials to diode rectifiers 509 and 511 together with the bit clock pulses applied to diode 508, open and gate 345 and supply the bit clock pulses to the core shift register 29 of the equipment.

The output of the and gate 336 is connected to a data read-in coil 528 which also surrounds the toroidal magnetizable core member 517. A read out coil 529 is also wound around core 517, and is connected through a decoupling rectifier 531 to the control grid of a cathode follower amplifier 532. Cathode follower 532 has its cathode load resistor 533 connected to the data read-in terminal of the core shift register 29 of the equipment to supply data thereto.

In operation, pulses waveform potentials supplied to the zero channel and representing zeros in the data are shaped by the bistable multivibrator 327 and applied through cathode follower amplifier 486 to and gate 334. Sequentially, pulsed signals representing ones in the data being read out are shaped by the bistable multivibrator 331 and supplied through cathode follower amplifier 497 to and gate 334. In the case of coincidence, and gate 334 opens and an error output indication is provided. If the equipment is operating properly, the and gate 334 will not normally open and signal pulses from either of the two channels will be supplied through either the diode rectifiers 492 or 493 of or gate 333 and through cathode follower amplifier 501 to shift clock oscillator 345. Shift clock oscillator 345 then develops a sinusoidal signal that is supplied to bistable multivibrator 506 which converts the sinusoidal signal to a square wave at the bit clock rate for application to core shift register to shift the data bits supplied thereto through the register. For this purpose, the bit clock pulses are supplied through cathode follower amplifier 507 to and gate 345. Prior to the and gate 345 opening, enabling potentials must be supplied to the diode rectifiers 509 and 511 thereof from the trace rejection circuit, and upon this occurrence the and gate opens and supplies the bit clock pulses to the core shift register to effect shifting of the data therethrough.

Simultaneously with the above described action, ones (1's) data signal pulses developed across the cathode load resistor 498 are applied to diode rectifier 522 of and gate 336. Concurrently, zero data pulses appearing across cathode load resistor 487 are applied to inverter 335 which functions to invert the zero data pulses and apply the inverted data to diode 525 of and gate 336. Accordingly, if there is a zero present in the data being read out, zero potential will appear in the output of cathode follower 519 of inverter circuit 335, and will present and gate 336 from opening. As a result, read-in coil 528 of the memory core 517 will not be energized so that upon application of a bit clock pulse to the bit clock read-in coil 515, the condition of the magnetizable core 517 will not have changed, and, accordingly, no signal will be generated in the read out coil 529 resulting in the registering of a zero in the core shift register. In the event that there is a one in the data being read out, a negative enabling potential will be applied to diode rectifier 522 of and gate 336. Simultaneously, there should be no data signal pulse applied to inverter 335 so that a negative enabling potential will be applied to the diode rectifier 525 of and gate 336. Assuming that the negative enabling potentials have been applied from the trace rejection circuit to diode rectifiers 526 and 527, then and gate 336 will open and apply a read-in signal to the read-in coil 528 of memory core 517. This read-in signal will cause he memory core to reverse its direction of magnetization. At the same time, the output of cathode follower 514 goes negative changing capacitor through diode rectifier. At the end of the clock pulse the capacitor will discharge through coil 515 causing the core 517 to return to its original state of magnetization causing an output signal pulse to be developed in the read-out coil 529 which will be applied through core driver cathode follower amplifier 532 to the core shift register where it will be registered as a one.

*Trace rejection logic circuits*

Figure 16:
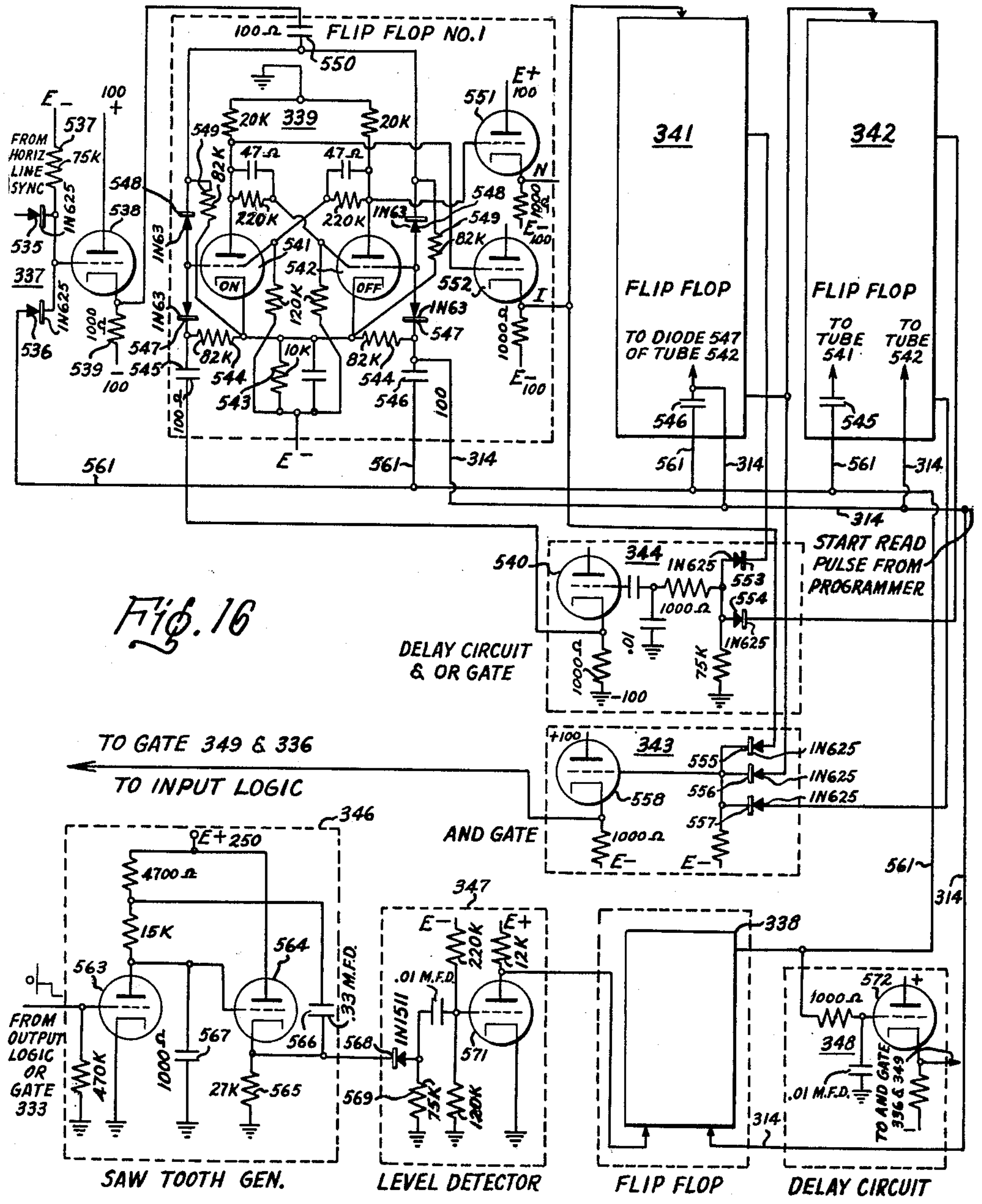
FIG. 16 is a circuit diagram of the trace rejection logic circuits comprising a part of the reading system shown in FIG. 7.

The trace rejection logic circuit of the reading system is shown in FIG. 16 of the drawings. This circuit includes and gate 337 which is formed by a pair of diode rectifiers 535 and 536, and a load resistor 537 connected to a source of negative potential. The output of and gate 337 is connected to the control grid of a cathode follower amplifier 538 having its cathode load resistor 539 coupled through a coupling capacitor to the input of bistable multivibrator or flip flop amplifier 339. Flip flop 339 comprises a part of a divide by five network that further includes flip flop amplifiers 341 and 342 which are identical in construction to flip flop 339, and hence only 339 is shown in detail. Flip flop 339 is the type which must be set in either one of two stable operating conditions by an outside signal. The flip flop is formed by a pair of electron tubes 541 and 542 having their cathodes connected through a common cathode resistor 543 to a source of negative potential, and their anodes connected through respective plate load resistors to a source of positive potential. The anodes and control electrodes of tubes 541 and 542 are interconnected through parallel resistance and capacitance networks, and a respective grid bias resistor is connected between the control grid of each tube and the source of negative biasing potential.

A first triggering network is connected to the control electrodes of tubes 541 and 542, and comprises a diode 547 and resistor 544 connected in series with the free end of the resistor 544 being connected to the cathode of its associated tube and the collector or anode of the diode being connected to the control grid of its associated tube. The junction of the diode 547 and resistor 544 of the first triggering network connected to tube 541 is coupled through coupling capacitor 545 to a cathode follower 540 to be described hereinafter. The junction of the first triggering network connected to tube 542 is coupled through a coupling capacitor 546 to conductor 314 which supplies a preconditioning reset pulse thereto. Flip flop 341 is similarly connected. However, flip flop 342 has the junction of the first triggering network connected to its tube 542 and connected directly to conductor 314. Coupling capacitor 546 of flip flops 339 and 341 are also connected to a conductor 561 which supplies a setting potential thereto from flip flop 338 as will be explained later. However, flip flop 342 has the conductor 561 connected to its coupling capacitor 545. A second triggering network is connected also to the control grids of both electron tubes 541 and 542, respectively, which comprise a diode 548 and resistor 549 connected in series with the free end of resistor 549 being connected to the cathode of its associated tube and the anode of the diode being connected to the control grid of the tube. The juncture of both the second triggering networks 548, 549 are connected together through a coupling capacitor 550 to the cathode load resistor 539 of cathode follower amplifier 538.

The pulsed wave form output signals appearing on the anode of tube 542 are supplied through a cathode follower amplifier 551, hereinafter referred to as the normal output terminal of flip flop 339, and the anode of tube 541 is connected to a cathode follower 552, hereinafter referred to as the inverse output terminal of flip flop 339. The inverse output terminal of flip flop 339 is connected to the capacitor 550 of the next succeeding flip flop 341 in the divider network which has its inverse output connected to the capacitor 550 of flip flop 342. The normal output of flip flop 341 is connected to a diode rectifier 553 of or gate 344. Flip flop 342 has its normal output connected to a diode 554 of or gate 344 with the output of the or gate being connected to cathode follower 540 whose load resistor is connected to capacitor 545 of flip flop 339. The inverse output terminals of each of the flip flops 339, 341 and 342 are connected to diode rectifiers 555, 556 and 557, respectively, of and gate 343 which has its output connected to a cathode follower 558. The output from cathode follower 558 is supplied to and gates 349 and 336 in the output logic circuits.

The flip flop amplifier 338 is controlled by a start pulse supplied from the output logic circuit or gate 333 which initiates operation of the saw tooth generator 346. Saw tooth generator 346 is comprised by an electron tube 563, and an electron tube 564 having a cathode load resistor 565 that is coupled back through a coupling capacitor 566 to the plate load resistor of the electron tube 563. The plate of tube 563 is also connected to a charging capacitor 567 connected across tube 563 so that a saw tooth wave form potential builds up upon a negative gating potential being supplied to the control grid of electron tube 563 from the output logic circuit or gate 333 which maintains tube 563 in the cut off condition. The cathode load resistor 565 is connected through a diode rectifier 568 of the threshold type which conducts only when a threshold value of potential has been applied thereto. The rectifier 568 is coupled across a load resistor 569 that is coupled through a coupling capacitor across a biasing network to the control grid of a conventional resistance coupled amplifier 571. Amplifier tube 571 has its anode connected through a suitable plate load resistor to a source of positive potential, and to the input of flip flop amplifier 338. Flip flop 338 is identical in construction to the flip flop 339 described above, and has its normal output terminal connected through conductor 561 to the inputs of each of the flip flop amplifiers 339, 341 and 342 as described above. Flip flop 338 also has a second input terminal connected to conductor 314 which supplies a start reset triggering potential thereto. The output of flip flop amplifier 338 is also coupled through a resistance-capacitance delay device 348 to the control grid of a cathode follower amplifier 572 whose cathode load resistor is connected to and gates 336 and 349 in the output logic circuits.

In operation, the start, reset triggering potential which initiates operation of the read out system is supplied from the programmer across conductor 314 and initially conditions all of the flip flop amplifiers 339, 341 and 342 to their 000 condition. By this condition is meant that a negative energizing potential is supplied from the output terminals of the flip flops 339, 341 and 342 to the three diode rectifiers 555, 556 and 557 of and gate 343. Diode and gate 343 opens as a consequence, but this has no effect on the setting of the and gates 336 and 349 in the output logic circuits because these and gates have not also been energized from delay circuit 348 simultaneously. The start reset potential is also supplied to the input of flip flop amplifier 338 as described previously so that it is in the reset condition. As the scanning read out electron beam of the vidicons reaches the light produced from the first block of gratings or bit of information in the table of data being read out, a negative polarity triggering potential will be produced by or gate 333 which is applied to the input of saw tooth generator 563. Saw tooth generator 346 in a sense operates as a noise discriminator in that it produces an output saw tooth wave form potential only as long as energizing potential is supplied from or gate 333. So or gate 333 must stay open before saw tooth generator 346 reaches the predetermined voltage amplitude that breaks down the threshold diode 568 and passes a triggering signal to the flip flop amplifier 338. By this arrangement it is assured that the scanning electron beam of the read out vidicons is indeed reading out light produced from data bits, and is not being energized from light produced by a scratch or some other noise producing feature in the thermoplastic film; for in such event insufficient light intensity would be put out to keep the or gate 333 open long enough to drive the saw tooth generator 346 to the predetermined voltage amplitude to break down threshold diode 568 and supply a triggering potential to the flip flop amplifier 338. Upon flip flop amplifier 338 being triggered to its second or set condition of operation, a negative triggering potential appears at its normal output terminal which is supplied through conductor 561 to each of the flip flop amplifiers 339, 341 and 342. This triggering potential will have no effect on flip flops 339 and 341 since it is applied to tubes 542 of these flip flops which have been cut off previously by the start reset pulse supplied from the programmer through conductor 314. The triggering potential will set flip flop 342, however, which sets the divider network comprised by all three flip flops to the three count or 101 condition due to feed back through or gate 344. The triggering potential produced by flip flop 338 is also supplied to diode rectifier 536 of and gate 337. Thereafter, upon the occurrence of a negative going line synchronizing pulse from the horizontal sync multivibrator 304 of the reading system, the and gate 337 opens and applies line gate negative triggering pulse potential through cathode follower amplifier 538 to coupling capacitor 550 of flip flop 339. The first line gate pulse which appears at the end of trace line 358 in FIG. 8 will them trigger the first flip flop amplifier 339 to its reset or zero condition where a negative enabling potential will be applied to diode rectifier 555 of and gate 343. It should be noted that the flip flop amplifiers in going from their set or one (1) condition to the reset or zero (0) condition produce a negative polarity carry pulse at their inverse output terminal which is connected to the next succeeding flip flop in the string. Accordingly, the first line gate pulse appearing at the end of scan line 358 temporarily triggers flip flop 339 from the set or one condition to the reset or zero condition resulting in temporarily setting the divider network to the 011 condition.

A feed back trigger pulse will be produced at the normal output of flip flop 341 in going to this condition which is coupled back through or gate 344 to tube 541 of flip flop 339 and results in again setting the flip flop amplifier 339 to its set or one condition so that the divider network comprised by the flip flops 339, 341 and 342 are then in the one-one-one (111) condition and no enabling potentials are applied to diode rectifiers 555, 556 and 557 of and gate 343 so that the and gate 343 stays closed. Upon the next succeeding line synchronizing pulse produced at the end of scan line 359 in FIG. 8 being applied to the and gate 337, this line synchronizing pulse will trigger flip flop 339 from its set or one condition to its reset or zero condition. This produces a carry pulse that triggers 341 to the reset condition which in turn resets flip flops 342 to zero (0) conditoin. As a result, the flip flop amplifiers 339, 341 and 342 will all be set in the zero-zero-zero (000) condition, and negative enabling potentials will be provided to all three diode rectifiers 555, 556 and 557 of and gate 343 from the inverse output terminals thereof. As a consequence, and gate 343 opens and will provide enabling potentials to the and gates 349 and 336 in the output logic circuits, which at this time have enabling potentials applied from flip flop 338 so they open and supply data pulses to the core shift register 29 thereafter.

The purpose of this two count before and gate 343 opens can best be appreciated from an examination of FIG. 8 of the drawings wherein two lines of data gratings or bits are shown representing bits of information to be read out. The dotted lines 356, 358, 359, 360, 361 and 363 represent scan paths of the read out beam of the vidicons which do not see the gratings as shown in FIG. 8 but would only see different colored light spots appearing at $357_1$, $357_0$, etc. whose color would depend upon whether the bit representing the group of grating lines within the parenthetical mark 357 is either a one or a zero. The shape of the read out electron beam must be rectangular so that the beam as it scans across it will cover one entire bit and will encompass all of the light from that bit in the direction of the line. To achieve proper read out, the read out beam should be of pencil sharpness so that it would be capable of a very fine scan spacing as represented by the spacing between the scan lines 356, 358, etc. In tracing out scan line 356, it can be appreciated that the read out beam of the vidicon would not see light, and hence no output would appear from the video amplifiers 325 and 328. Upon reaching scan line 358, however, the read out vidicons would develop data bearing output signal pulses which would open or gate 333, and set the flip flops 339, 341 and 342 at the count three of 101 condition. Thereafter the line synchronizing pulses which in fact represent the beginning of the next scan line to be traced out by the read out beam would be supplied to the counter at the beginning of the scan lines 359 and 361. Scan line 361 occurs after the second line gate pulse has been applied to the counter so that and gate 343 opens and in turn opens the and gates 349 and 336 in the output logic circuits allowing the data signal pulses produced during scan line 361 to be read into the core shift register 29.

Upon reaching the end of the line of data represented by the scan line 361, it can be appreciated that there are a total of five scan lines from the middle of the line of data read out over scan line 361 to the middle of the next line of data to be read out represented by the scan line 363. In order to inactivate the read out logic circuit, and hence decouple the core shift register 29 from the output of the read out video amplifier 328 during the intermediate four scan lines, the line gating pulse produced at the end of the scan line 361, or the beginning of the next scan line, however one wishes to look at it, will reset the flip flop amplifiers 339, 341 and 342 to the one-zero-zero (100) condition. Setting of the flip flop amplifiers 339 and 341 and 342 to the 100 condition removes the enabling potentials from the diode rectifiers 555, 556 and 557 so that and gate 343 closes and removes the enabling potentials supplied to the and gates 349 and 346. Consequently, each of these and gates also close thereby decoupling the core shift register 29 from the output of video amplifier 328. The flip flop amplifier 338 which was set by level detector 347 remains in the set condition until a start reset pulse is again supplied thereto from the programmer. This is appropriate since the edge of the table or block of bits of information to be read out has been identified, and the middle of the first line of bits has been located. Thereafter, the counter formed by flip flops 339, 341 and 342 will count down five lines before opening and gate 343 in the following manner.

After resetting the counter to the 100 condition at the end of line 361, the line gate synchronizing pulse produced at the end of the first line of scan under 361 of FIG. 8 turns on tube 541 which produces a negative triggering pulse at the inverse output of flip flop 339 that triggers flip flop 341 to the one condition, and which temporarily sets flip flop 339 in the zero condition. However, a negative feed back potential from flip flop 341 supplied through or gate 344 to the control grid of cathode follower amplifier 540 cuts off that tube and results in applying a negative potential trigger pulse to tube 541 of flip flop 339 that again sets flip flop 339 to the one condition. This sequence of operations leaves the counter in the 110 condition so that and gate 343 remains closed. The line gate pulse produced at the end of the second line of scan after line 361 will operate temporarily to reset flip flop 339 in the zero condition, to reset flip flop 341 in the zero condition, and to set flip flop 342 in the one condition. However, feed back from flip flop 341 inverse output again drives electron tube 541 of flip flop 339 into cut off thereby again setting flip flop 339 and leaving the counter in the 101 condition which still leaves and gate 343 closed. The next line synchronizing pulse to appear at the end of the third line of scan following line 361 serves to reset flip flop 339 to the zero condition, an to set flip flops 341 and 342 to the one condition. This results in setting the counter to 011 condition where a negative potential pulse appearing at the inverse output terminals of flip flop 341 feeds back through or gate 344 to cut off tube 541 and set the counter to the 111 condition. Accordingly, the next line gate pulse produced at the end of the fourth line following line 361 of FIG. 8, and hence at the beginning of the fifth line (line 363) will set all three flip flops to their zero condition. This results in setting the counter to the 000 condition so that and gate 343 opens, and applies enabling potentials to and gates 336 and 349 of the output logic circuit. These last two and gates then open and allow data being read out by the vidicons 38 and 39 as they scan along line 363 of FIG. 8 to be shifted into the core shift register 29. At the completion of line 363, the entire cycle of operations just described is repeated to read the next line of data bits into core shift register 29 until the entire table of 32 lines has been read out and stored in the core sift register. Upon this occurrence, the vertical sweep potential will reach a magnitude sufficient to break down level detector 319 of the reading system, and turn off flip flop 321 thereby providing a read out finished signal to the programmer.

*Core shift register*

Figure 17:
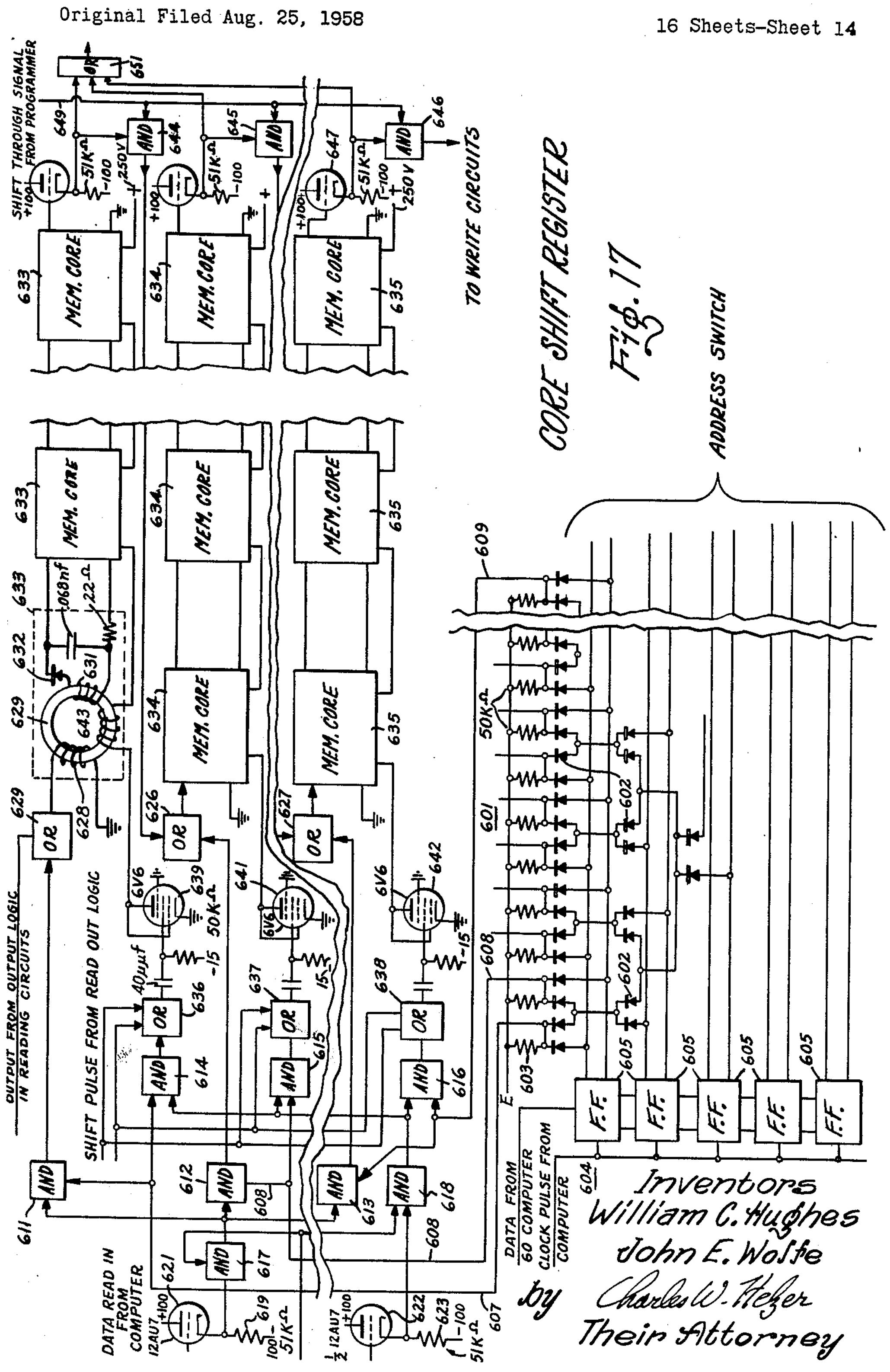
FIG. 17 is a combined functional block diagram and circuit diagram showing the construction of the core shift register unit which comprises a part of the drum data storage equipment of FIG. 1.

The core shift register 29 serves as a working memory for the data storage equipment and is showin in FIG. 17 of the drawings. The core shift register 29 comprises an input address register which is formed from a pyramid diode switch 601 of the type described in the reference textbook "Digital Computer Components and Circuits" by R. K. Richards, published by Van Nostrand Company of Princeton, New Jersey (pg. 41). Pyramid switch 601 includes a plurality of pyramided diode rectifiers 602 and associated load resistor 603, which are connected to a source of negative potential. The diode rectifiers are controlled from an address register 604 formed by a set of five serially connected flip flop bistable multivibrator amplifiers 605 which are similar in construction to the bistable flip flop 339 described in connection with the trace rejection circuits and which selectively apply negative polarity enabling potentials to the diodes of diode switch 602. The switch then operates to apply a negative polarity potential across a selected one of the output lines thereof, such as 607, 608 or 609, determined by the setting of the address register. The series of five flip flop amplifiers 605 have a total of 32 different stable states of operation, and the pyramid diode switch 601 likewise has 32 output lines, such as are indicated at 607, 608 or 609, which may be selected by an appropriate address supplied to the address register 604 from the computer to which the register is connected. The computer also supplies a series of clock pulses to each of the flip flop amplifiers 605 in the register 604 for shifting address data supplied thereto through the register. It is, of course, impossible to show all 32 different lines corresponding to the lines 607 and 608 together with their associated diode rectifiers and load resistors. However, it is believed adequate to show the portion thereof which has been illustrated, and to describe its operation. Each of the output lines 607, 608 and 609 are connected to a first set of associated and circuits 611, 612 and 613, respectively, and to a second set of associated and circuits 614, 615 and 616, respectively. The first set of and gates 611, 612 and 613 also have additional input potentials supplied thereto from a data read-in and gate 617, and hence are termed data line and gates. The second set of and gates 614, 615 and 616 also have additional input potentials supplied thereto from a clock pulse read-in and gate 618. The data input and gate 617 and clock pulse and gate 618 have energizing potentials supplied thereto from an interlock signal supplied from the programmer, the purpose of which will be explained more fully hereinafter, and additionally have pulsed input potentials supplied thereto from the computer which represents data to be read in to the core shift register and clock pulses for use in shifting the data through the register. For this purpose, the input to the and gate 617 is connected across the cathode load register 619 of a cathode follower amplifier 621 to which data to be stored in the core shift register is supplied. Accordingly, pulsed potentials appearing across the cathode load resistor 619 represent the data to be stored in the core shift register and are supplied through and gate 617 assuming, the interlock to be opened, to all of the data line and gates 611, 612 and 613. Clock line and gates 614, 615 and 616 are all connected to a source of clock shift pulses supplied from the computer through a cathode follower amplifier 622 having its cathode load resistor 623 connected to and gate 618 which is connected to all of the and gates 614, 615 and 616. Each of the data line and gates 611, 612 and 613 have their outputs supplied directly to data line or gates 625, 626 and 627, respectively. The or gate 625 has a second input connection to which the data bearing signals from the output logic circuit shown in FIG. 14 are applied. The output of or gate 625 is connected to the first memory core unit 633 of a line 32, such units each of which comprise a read-in coil 628 that surrounds a torodial magnetic memory core 629 constructed of ferrite, permalloy, or some other suitable magnetizable material. The memory core unit 633 has read-in coil 628 connected directly to the output of or gate 625, and further includes a read-out coil 631 connected through a diode rectifier 632 across a resistance-capacitance load circuit to the input of a second memory core unit 633 that is identical in construction. The data line or gates 626 and 627 have only a single input connection from their associated and gates, but the outputs thereof are connected in a fashion similar to or gate 625 to the read-in coils of the first of a line of 32 memory core units 634 and 635, respectively, each of which is identical in construction to the memory core 633.

The clock line and gates 614, 615 and 616 each have their outputs connected to an input connection of clock line or gates 636, 637 and 638, respectively. Each of the clock line or gates 636, 637 and 638 have two additional input connections supplied by shift clock pulses from either the output logic circuit of the reading system, or shift clock pulses from the write circuit. Each of the clock line or gates 636, 637 and 638 has its output connected through a pulse forming network and a conventional amplifier 639, 641 or 642 to the first one of the line of 32 memory core units 633, 634 or 635 associated therewith. For this purpose, amplifier 639 has its plate electrode connected through a clock read-in coil 643 surrounding core 629 of the first memory core unit 633 in the line, and connected serially through corresponding read-in coils in the remaining memory core units 633 in the line to a source of positive plate potential. By reason of this construction, all of the read-in coils of the line of memory core units 633 are connected in series electric circuit relationship between the anode of electron tube 639 and the source of positive plate potential. The additonal lines of 32 memory core units 634, 635, etc. formed are connected in precisely the same manner as the line memory cores 633 except for one difference, however. In place of the data signals supplied directly from the output logic circuits of the reading system to or gate 625, the or gate 626, 627, etc. have an input connection back to read-through and gates 644, 645 and 646, respectively. The read-through and gates 644, 645 and 646 have one input terminal connected through cathode follower amplifiers 647 to the output of the last memory core unit in each line of memory cores 633, 634 and 635, respectively, and also have a read-through gating potential supplied thereto from a conductor 649 that is connected to a shift through signal source provided in the programmer unit 28 of the equipment. This shift through signal enables the shift through and gates 644, 645, 646, etc. to couple data signals being shifted out of the last memory core unit in a line such as 633 to be supplied back through the read through and gate to the data line or gate of the next succeeding line of memory core units 634, and so on down through the entire table of 32 lines of such memory core units. The last read-through and gate 646 has its output connected to the write circuits so that data being shifted out of the table of 32 memory cores by 32 memory cores may be supplied to the writing circuits previously described. In addition to being supplied to the read-through and gates 644, 645, 646, etc. at the end of each line of memory core units, the data signals being shifted out of any one of the lines of memory core units may also be supplied through an or gate 651 which is connected to the output of the last memory core unit in each line, and has its output connected to the computer unit. As will be explained more fully hereinafter, the data contained in any one of the lines of memory core units 633, 634, 635, etc. may be selectively supplied to the computer in response to a request for the same supplied to the address register 604 from the computer.

If it is desired to utilize the core shift register as a working memory in writing data on the thrmoplastic film surface of drum 11, it is first necessary to read the data to be written into the core shift register. For this purpose, it is not essential that the drum be properly located with respect to the writing apparatus, and accordingly it is not necessary that the programmer be actuated at this point. This is important due to the nature of construction of the programmer which produces an interlock potential only when the programmer is inactive. Accordingly, potential will be supplied through the interlock connections to the and gates 617 and 618 so that these gates can open and supply data signal pulses through the cathode follower amplifier 621 and and gate 617 to any of the data line and gates 611, 612 and 613 which may have been opened by pyramid switch 601 in response to an address supplied to the address register 604 from the computer. Similarly, opening of the and gate 618 allows shift clock pulses supplied from the computer to be applied through cathode follower 622 and and gate 618 to the selected one of the line clock and gates 614, 615 or 616. Prior to the opening of the and gates 617 and 618, however, the address for the data to be stored in core shift register is furnished to the address register 604 comprised by flip flop amplifiers 605 from the computer, and is shifted through the address register by clock pulses supplied also from the computer. The address signal sets the address register 604 so that pyramid diode switch 601 supplies an enabling potential to the selected one or ones of the data line and gates 611, 612 or 613, as well as to their associated clock and gates 614, 615 and 616. If it is desired to read data into the entire table 32×32 memory cores of the shift register, then, of course, the address supplied from the computer must be properly coded so as to open first data line and gate 611 as well as as its associated line clock and gate 614, and similarly each line of cores thereafter in sequence until the entire table of data is stored. Data supplied from the computer is then fed through the cathode follower amplifiers 621 and and gate 617, and gate 611, and or gate 625 to the data read-in winding 628 of the first memory core unit 633 in the first line of memory cores. Sequentially clock pulses supplied from the computer through the cathode follower 622, and gate 618, and gate 614, or gate 636 and amplifier 639 are applied to the clock read-in winding 643 of the first memory core unit 633 of the first line of cores. The successive data signal pulses set the direction of magnetization of the magnetic memory cores so that the setting of a core represents a bit of information in binary form. This information is then shifted down the entire line of memory core units 633 by the clock pulses. Upon filling the entire line of 32 memory core units 633, the computer must then address the next line of memory core units 634 so as to open the and gate of that line in a similar fashion and fill it with the data to be stored in a similar manner. This operation is then carried throughout the entire 32 lines of memory core units to fill the table.

After the memory core units in the core shift register have been filled with the data to be written, it may then be desired to read the data out to the writing circuits of data storage equipment. For this purpose, the computer must operate through the programmer 28 to properly drive the servo positioning mechanism of the equipment which positions the drum 11 at the desired location where the table of data stored in the core shift register is to be recorded. Actuation of the programmer 28 will then cause the interlock to close and gates 617 and 618 so no further data signals may be supplied to the core shift register. Simultaneously, the programmer 28 supplies an operating potential through conductor 649 to the read-through and gates 644, 645 and 646. At this point, the shift register is then ready to read out the data stored therein to writing circuits, and this is accomplished by supplying clock pulses from the writing circuits through the or gates 636, 637 and 638 to the read-out coils 643 of the magnetic core units 633, 634, 635. The clock pulses will then serially read all of the data stored in the core storage through the read-through and gates 644 and 645, etc. and out through the last read-through and gate 646 to the write circuits. It is not possible to write the data from only a selected line of memory cores since only the last read-through and gate 646 is connected to the write circuits. However, should it be desired to write only a single line of data, it is possible to set the instructions fed from the computer into the address register 604 of the pyramid switch 601 in such a manner that the desired line of data is stored in the desired line of magnetic core units with the remainder of the lines of the cores being set to zero. With the core shift register thus stored, it is then possible to write the data from the single line of the memory cores into a desired location on the thermoplastic film.

It is also possible that once the memory cores 633, etc. in the core shift register 29 have had data stored therein, that the data stored in a single line of memory cores be used in a computer operation. In this eventuality, the address for the desired line of data is supplied to the address register 604 of diode switch 601. The desired line of memory cores 633, etc. then has enabling potentials applied to the data line and gate and clock line and gate thereof. For example, if the data is stored in memory cores 634, then the address register flip flops 605 will provide negative enabling potentials to the diode rectifier 602 of diode switch 601 connected to output line 608. This connects a negative enabling potential to the and gates 612 and 615. If it is desired to apply new data to the line of memory cores 634 simultaneously with the shifting out of the data stored therein, this can be done by applying the new data from the computer to the cathode follower amplifier 621 simultaneously with the application of the clock pulses supplied through cathode follower 622, and gate 618, and gate 615, and amplifier 641 to the clock read-in coils of the cores 634. However, in the event it is desired only to read out the data stored in the cores 634 leaving the line of memory cores in the zero state after reading it out, no data signal pulses need be supplied from the computer, and only the clock pulses are supplied. In either event, data signal pulses representative of the data stored in the cores are coupled through cathode follower amplifier 647 at the end of the selected line of memory cores 634, and through or gate 651 to the computer which can then use the data in its computational operations.

In the event it is desired to read out information previously stored on the thermoplastic film surface of drum 11, all that is required is that the programmer apply an energizing potential to the read-through and gates 644, 645, etc. and the data signals developed by the vidicons 38 and 39 be supplied to or gate 625 of the line of magnetic core units 633. With the core shift register thus actuated, the data signals developed by the vidicons are supplied serially to the memory core units 633, 634, 635 and shifted through each memory core unit in each line until the entire table of cores is filled. The data thus read into the core shift register 29 may then be used in any of the previously described manners by the computer in its operations.

*Programmer unit*

Figure 18:
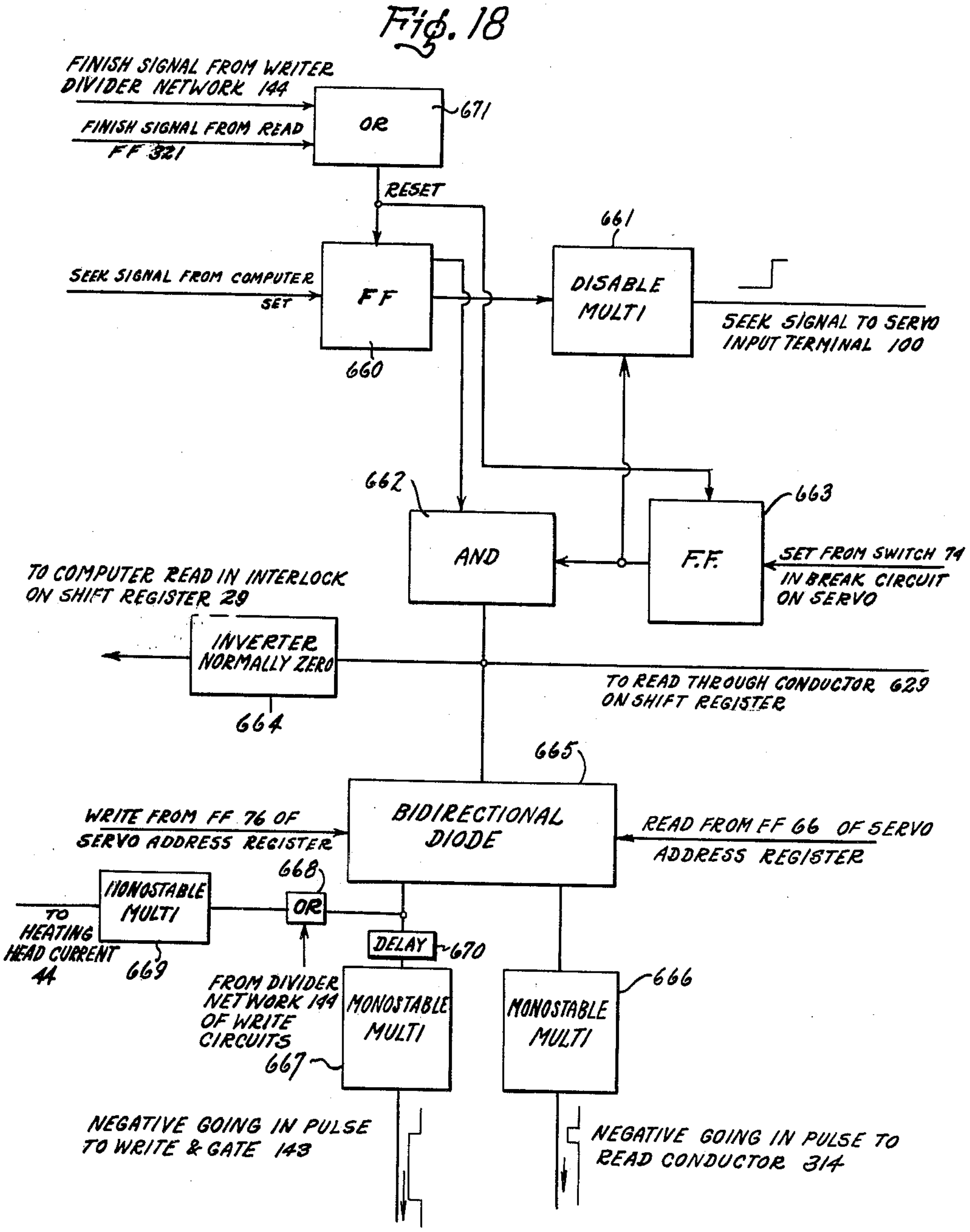
FIG. 18 is a functional block diagram showing the construction of the program control unit that is used in the drum data storage equipment shown in FIG. 1.

FIG. 18 is a functional block diagram showing the construction of the programmer unit 28 which comprises the heart of the new and improved digital data storage equipment disclosed in FIGS. 1–18 of the drawings. Programmer unit 28 develops and provides the different control signals to the various elements of the equipment and includes bistable flip flop multivibrator 660 to which is supplied a seek signal from the computer when it is desired to actuate the data storage equipment. The flip flop 660 has its output connected to a conventional cathode coupled bistable multivibrator 661 which provides an energizing potential to the servo mechanism shown in FIG. 2 driving the drum 11 to position it at a desired location previously set into the servo mechanism address register. Flip flop amplifier 660 also provides a negative energizing potential to an and gate 662 which receives a second energizing potential from a flip flop amplifier 663 actuated by the control relay switch 74 in the brake circuit of the servo mechanism. The and circuit 662 provides operating potential to the shift through conductor 629 on the core shift register, as well as through an inverter 664 to the computer interlock gates 617 and 618 on the core shift register. The inverter 664 provides a zero output potential to the interlock gates upon and gate 662 opening, and in the event there is no potential supplied from the and gate 662, inverter 664 develops an opening potential that is supplied to the interlock. The output of and gate 662 is also supplied to a bi-directional gate 665 which has two control switching potentials supplied thereto, one from the write signal developed by flip flop 76 of the servo mechanism address register shown in FIG. 2, and the other from the read signal developed by flip flop 76. The bi-directional diode gate 665 will then apply an energizing potential selectively to either a monostable multivibrator 666 or through a delay circuit 670 to a monostable multivibrator 667 in response to the control switching potentials supplied from flip flop 76. Monostable multivibrator 666 if energized develops a pulsed trigger potential that is supplied to read conductor 314 of the read equipment for actuating the read equipment, and monostable multivibrator 667 when energized develops a pulsed potential that is applied to and gate 143 of the writing equipment. Also connected to the output terminal of the bidirectional diode gate 665 to which the bistable multivibrator 667 is connected is an or gate 668 which applies an operating potential to a monostable multivibrator 669 which in turn applies an operating potential to the heating head control circuit 44 of the equipment. Additionally, or gate 668 has an input energizing potential supplied thereto from divider network 144 of the write circuits which will again operate multivibrator 669 at the end of the write cycle. Finished signals from either the write system divider network 144 or the reading system flip flop 321 are supplied to an or grate 371 which resets flip flops 660 and 663 to turn off the equipment. The elements of the block diagram shown in FIG. 18 of the drawing are all conventional in construction, or their details of construction have been described previously in connection with other parts of the equipment. Hence, it is not believed necessary to disclose the circuit details of each of the elemental blocks of the programmer shown in FIG. 18.

In operation, the computer will supply a desired address to the address register of the servo systems which drives the rotatable and translatable drum 11 to condition the servo systems for actuation. An instant later the computer will provide a seek signal to flip flop amplifier 660 which in turn triggers the bistable multivibrator 661. Bistable multivibrator 661 develops a pulsed output potential that energizes the servo mechanisms for driving the drum 11 to its desired position. Simultaneously, flip flop amplifier 660 supplies operating potential to and gate 662 which opens upon receiving an enabling potential from the flip flop amplifier 663 that is activated by the switch 74 on the brake circuit of the servo mechanism. Flip flop 663 also turns off or resets flip flop 661. Coincidence in the operating potentials supplied to the and gate 662 causes it to open and supply operating potentials to the read-through gate conductor 629 on the core shift register, to the inverter 664, and to bi-stable diode gate 665. Operation of the bi-directional diode gate 665 is controlled from the read or write portion of the address supplied from the computer to the address register flip flop 76 of the servo mechanism which in turn supplies either a write or read switching potential to bi-directional diode gate 665 that triggers read monostable multivibrator 666 or write monostable multivibrator 667 through delay circuit 670. If energized, multivibrator 666 develops a pulsed trigger potential which is supplied to the reading circuits of the equipment to initiate their operation. If a switching signal is provided to multivibrator 667, the heating head control circuit 44 is first actuated by or gate 668 and multivibrator 669 to condition the thermoplastic film to be written on. Multivibrator 667 then develops a pulsed trigger potential that is supplied to the write circuits of the equipment to initiate their operation. Upon the write or read systems completing their cycle of operation, a finished signal is applied back to or gate 671 connected to the input of flip flop 660 which then turns off flip flop 660, and resets the flip flop amplifier 663. Simultaneously, in the event the write circuit was energized, a write finished signal is applied to or gate 668 which then supplies operating potential to monostable multivibrator 669 to actuate the heating head on the write equipment to cure the data just written.

From the foregoing description, it can be appreciated that the present invention makes available to the industry an entirely now and improved data storage equipment that is capable of storing relatively large quantities of data in a comparatively small space. This is achieved without any sacrifice in the access time required to locate any particular data and read it out, or in the time required to store data in the storage equipment. Further, because equipment made available by the invention is capable of reading out and recording data bits in characteristic colors that are readily recognizable and easily recorded, the noise elimination characteristics of the equipment are excellent, and hence the equipment is highly reliable in operation.

Obviously, many modifications and variations of the present invention are possible in the light of the above teachings. It is, therefore, to be understood that changes may be made in the particular embodiments of the invention described herein which are within the full intended scope of the invention as defined by the appended claims.

What we claim as new and desire to secure by Letters Patent of the United States is:

1. In a digital data information storage device the combination of a rotatable drum having an impressionable solid thermoplastic recording medium secured to the surface thereof, a readout device for inspecting discrete areas of the thermoplastic recording medium and deriving an output electric signal indicative of the intelligence impressed on the thermoplastic recording medium by electron writing, automatic positioning means for accurately positioning said drum rotationally and longitudinally in any desired location with respect to said readout device, position control means for accurately controlling the operation of said positioning means, and readout logical circuit means operatively coupled to said readout device for controlling the operation of the readout device in accordance with a preset schedule, said readout logical circuit means including data block edge recognition means for identifying the beginning edge of a data block during readout.

2. The combination set forth in claim 1 wherein said readout means comprises an optical assembly for projecting an optical image of the intelligence patterns formed on the impressionable recording medium, and electron-optical means viewing such projected optical image for deriving output electric signals representative of the intelligence formed in said patterns.

3. The combination set forth in claim 2 further characterized by color separating means interposed between said optical assembly and said electron-optical means, said electron-optical means viewing the projected optical image through said color separating means.

4. In a digital data information storage device the combination of a rotatable drum having an impressionable solid thermoplastic recording medium secured to the surface thereof, an electron writing apparatus for impressing electrons on said thermoplastic recording medium in desired patterns, heating means for heating the surface of the impressionable solid thermoplastic recording medium to a substantial liquid state to cause deformation of the surface in accordance with the electron patterns, means for subsequently restoring the surface of the thermoplastic film recording medium to a solid state by cooling to a lower temperature to thereby permanently preserve the deformations therein, a readout device for inspecting discrete areas of the thermoplastic recording medium and deriving an output electric signal indicative of the intelligence impressed thereon, selectively operable positioning means for accurately positioning said drum rotationally and longitudinally in any desired location with respect to said electron writing apparatus, said readout device and said heating means, position control means for accurately controlling the operation of said positioning means, readout logical circuit means operatively coupled to said readout device for controlling the operation of the readout device in accordance with a pre-set schedule, said readout logical circuit means including data block edge recognition means for identifying the beginning edge of a data block during readout, and program control circuit means for selectively controlling operation of said electron writing apparatus, said position control means, said heating means, and said readout logical circuit means.

5. The combination set forth in claim 4 wherein said readout means comprises an optical assembly for projecting an optical image of the intelligence patterns formed on the impressionable recording medium, and electron-optical means viewing such projected optical image for deriving output electric signals representative of the intelligence formed in said patterns.

6. The combination set forth in claim 5 further characterized by color separating means interposed between said optical assembly and said electron-optical means, said electron-optical means viewing the projected optical image through said color separating means.

7. In a digital data information storage device the combination of a rotatable drum having an impressionable solid thermoplastic recording medium secured to the surface thereof, an electron writing apparatus for impressing electrons on said impressionable thermoplastic recording medium in desired intelligence conveying patterns, heating means for heating the surface of the solid thermoplastic film storage medium to a substantially liquid state to cause deformation of the surface in accordance with the electron patterns, means for subsequently restoring the surface of the thermoplastic film recording medium to a solid state by cooling to a lower temperature to thereby permanently preserve the deformations therein, a readout device for inspecting discrete areas of the thermoplastic recording medium and deriving an output electric signal indicative of the intelligence impressed thereon, readout logical circuit means operatively coupled to said readout device for controlling the operation of the readout device in accordance with a pre-set schedule, said readout logical circuit means including data block edge recognition means for identifying the beginning edge of a data block during readout, an electrically operative memory device coupled to said readout means for storing discrete amounts of intelligence signals supplied thereto by said readout means, automatic positioning means for positioning said drum rotationally and longitudinally in any desired location with respect to said electron writing apparatus, said heating means and said readout means, position control means comprising a first selsyn system for accurately controlling the operation of the positioning means to rotate the drum and thereby position the thermoplastic recording medium in a first dimension, and a second selsyn system for accurately controlling the operation of the positioning means to position the drum in either direction along its longitudinal axis and thereby position the thermoplastic recording medium in a second dimension substantially at right angles with respect to the first dimension, a digital-to-analog converter for controlling each of said selsyn systems in response to digital type control signals, and program control circuit means for selectively controlling operation of said electron writing apparatus, said position control means, said heating means and said readout logical circuit means.

8. The combination set forth in claim 7 wherein said readout means comprises an optical assembly for projecting an optical image of the intelligence patterns formed on the impressionable recording medium, and electron-optical means viewing such projected optical image for deriving output electric signals representative of the intelligence formed in said patterns.

9. The combination set forth in claim 8 further characterized by color separating means interposed between said optical assembly and said electron-optical means, said electron-optical means viewing the projected optical image through said color separating means.

10. In a data storage device, the combination of a rotatable drum having an impressionable solid themoplastic recording medium formed on the surface thereof, electron writing apparatus for impressing electrons on said impressionable medium in desired patterns to form permanent light modifying deformations representing data to be stored, heating means for heating the surface of the thermoplastic recording medium to a substantial liquid state to cause deformation of the surface in accordance with the electron patterns, means for subsequently restoring the surface of the thermoplastic film recording medium to a solid state by cooling to a lower temperature to thereby permanently preserve the deformation therein, selectively operable positioning means for accurately positioning said rotatable drum rotationally and longitudinally in any desired location with respect to said electron writing apparatus and said heating means, and position control means for accurately controlling the operation of said positioning means and comprising a first selsyn system for accurately rotating said drum to position the thermoplastic recording medium in a first dimension and a second selsyn system for accurately moving said drum in a direction along its longitudinal axis to position the thermoplastic recording medium in a second dimension substantially at right angles with respect to the first dimension.

11. In a data storage device the combination of an impressionable solid thermoplastic recording medium, readout means for inspecting permanent light diffraction gratings formed on said thermoplastic recording medium in intelligence conveying patterns by electron writing for deriving an output electric signal indicative of such intelligence, readout logical circuit means including data block edge recognition means for identifying the beginning edge of a data block during readout for controlling the operation of the readout device in accordance with a predetermined schedule, automatic positioning means for accurately positioning said medium in two transverse directions to position any desired location on said medium under said readout means, and position control means for accurately controlling the operation of said positioning means.

12. The combination set forth in claim 11 wherein said readout means comprises an optical assembly for projecting an optical image of the intelligence patterns formed on the impressionable recording medium, and electron-optical means viewing such projected optical image for deriving output electric signals representative of the intelligence formed in said patterns.

13. The combination set forth in claim 12 further characterized by color separating means interposed between said optical assembly and said electron-optical means said electron-optical means viewing the projected optical image through said color separating means.

14. In a digital data storage device the combination of a movable impressionable solid thermoplastic recording medium, an electron beam writing apparatus for impressing electrons on said thermoplastic recording medium in desired intelligence conveying patterns, heating means for heating the surface of the impressionable solid recording medium to a substantially liquid state to cause deformation of the surface in accordance with the electron patterns, means for subsequently restoring the surface of the thermoplastic film recording medium to a solid state by cooling to a lower temperature to thereby permanently preserve the deformations, readout means for inspecting the thermoplastic film recording medium for deriving an output electric signal indicative of such intelligence, automatic random access positioning means for positioning said thermoplastic film recording medium in any desired location wtih respect to said electron beam writing apparatus and said readout means, position control means comprising a first selsyn system for accurately moving the thermoplastic recording medium in a first dimension, and a second selsyn system for accurately moving the thermoplastic recording medium in a second dimension substantially at right angles with respect to the first dimension, said position control means including a digital-to-analog converter for controlling each of said selsyn systems in response to digital type control signals, read logical circuit means operatively coupled to said readout device for controlling the operation of the readout device in accordance with a preset schedule, said readout logical circuit means including block edge recognition means for identifying the beginning edge of a data block during readout, and program control circuit means for selectively controlling the operation of said electron beam writing apparatus, said random access positioning means, and said readout logical circuit means.

15. The combination set forth in claim 14 wherein said readout means comprises an optical assembly for projecting an optical image of the intelligence patterns formed on the impressionable recording medium, and electron-optical means viewing such projected optical image for deriving output electric signals representative of the intelligence formed in said patterns.

16. The combination set forth in claim 15 further characterized by color separating means interposed between said optical assembly and said electron-optical means, said electron-optical means viewing the projected optical image through said color separating means.

17. In a digital data information storage device the combination of a rotatable drum having an impressionable solid thermoplastic recording medium secured thereto, an electron writing apparatus for impressing electrons on said thermoplastic recording medium in desired intelligence conveying patterns, heating means for heating the surface of the impressionable solid thermoplastic recording medium to a substantially liquid state to cause deformation of the surface in accordance with the electron patterns, means for subsequently restoring the surface of the thermoplastic film recording medium to a solid state by cooling to a lower temperature to thereby permanently preserve the deformations, a readout device for inspecting discrete areas of the thermoplastic recording medium and deriving an output electric signal indicative of the intelligence impressed on the thermoplastic recording medium, selectively operable automatic positioning means for accurately positioning said drum rotationally and longitudinally in any desired location wtih respect to said electron writing apparatus and said readout device, and position control means for accurately controlling the operation of said positioning means and comprising a first selsyn system for accurately rotating said drum to position the thermoplastic recording medium in a first dimension and a second selsyn system for accurately moving said drum in a direction along its longitudinal axis to position the thermoplastic recording medium in a second dimension substantially at right angles with respect to the first dimension.

18. The combination set forth in claim 17 wherein said readout means comprises an optical assembly for projecting an optical image of the intelligence patterns formed on the impressionable recording medium, and electron-optical means viewing such projected optical image for deriving output electric signals representative of the intelligence formed in said patterns.

19. The combination set forth in claim 18 further characterized by color separating means interposed between said optical assembly and said electron-optical means, said electron-optical means viewing the projected optical image through said color separating means.

20. In a digital data storage device the combination of a rotatable drum having an impressionable solid thermoplastic recording medium formed on the surface thereof, electron writing apparatus for impressing electrons on said impressionable thermoplastic recording medium in desired intelligence conveying patterns to form permanent light modifying deformations representing data to be stored, heating means for heating the surface of said solid thermoplastic recording medium to a substantially liquid state to cause deformation of said surface in accordance with said charge pattern, the deformations thus recorded being preserved upon the surface of said thermoplastic film being returned to a solid state by cooling, automatic positioning means for accurately positioning said rotatable drum rotationally and longitudinally in any desired location with respect to said electron writing apparatus and said heating means, position control means comprising a first selsyn system for accurately rotating said drum to position the thermoplastic recording medium in a first dimension and a second selsyn system for accurately moving said drum in a direction along its longitudinal axis to position the thermoplastic recording medium in a second dimension substantially at right angles with respect to the first dimension, a digital-to-analog converter for controlling each of said selsyn systems in response to digital type control signals, and program control circuit means for selectively controlling the operation of said electron beam writing apparatus, said random access positioning means, and said heating means.

References Cited by the Examiner

UNITED STATES PATENTS

| | | | |
|---|---|---|---|
| 1,746,959 | 2/30 | Neely | 340—174.1 |
| 1,891,780 | 12/32 | Rutherford | 340—173 |
| 2,229,293 | 1/41 | Huntly | 340—174.1 |
| 2,391,451 | 12/45 | Fischer | 340—174.1 |
| 3,071,757 | 1/63 | Levene | 340—174.1 |

OTHER REFERENCES

Pages 98–109, April 1951, publication: "Heat Developed and Powder, Lichtenberg figures * * *" by Thomas et al., British Journal of Applied Physics.

IRVING L. SRAGOW, *Primary Examiner.*